US009926866B2

United States Patent
Lahti et al.

(10) Patent No.: US 9,926,866 B2
(45) Date of Patent: Mar. 27, 2018

(54) SYSTEM AND METHOD FOR EXHAUST GAS RECIRCULATION FLOW CORRECTION USING TEMPERATURE MEASUREMENTS

(71) Applicant: Deere & Company, Moline, IL (US)

(72) Inventors: John L. Lahti, Cedar Falls, IA (US);
Michael J. Maney, Waterloo, IA (US);
Dustin W. Ridenour, Independence, IA (US); Michael J. Pipho, Dunkerton, IA (US)

(73) Assignee: Deere & Company, Moline, IL (US)

( * ) Notice: Subject to any disclaimer, the term of this patent is extended or adjusted under 35 U.S.C. 154(b) by 181 days.

(21) Appl. No.: 14/706,451

(22) Filed: May 7, 2015

(65) Prior Publication Data

US 2016/0326974 A1    Nov. 10, 2016

(51) Int. Cl.
*F02D 41/00* (2006.01)
*F02D 41/14* (2006.01)
(Continued)

(52) U.S. Cl.
CPC ..... *F02D 41/0072* (2013.01); *F02D 41/1401* (2013.01); *F02D 41/144* (2013.01);
(Continued)

(58) Field of Classification Search
CPC .............. F02D 41/0072; F02D 41/1441; F02D 41/1401; F02D 41/144; F02D 2200/0402;
(Continued)

(56) References Cited

U.S. PATENT DOCUMENTS 2,075,388 A * 3/1937 De Cloud ............... F02B 77/02
                                                         123/669
5,974,870 A   11/1999 Treinies et al.
                (Continued)

FOREIGN PATENT DOCUMENTS

EP      1731744 A1    12/2006
EP      1914415 A2    4/2008
(Continued)

OTHER PUBLICATIONS

European Search Report in foreign counterpart application No. 16168071.5, dated Oct. 11, 2016 (8 pages).

*Primary Examiner* — Joseph Dallo
(74) *Attorney, Agent, or Firm* — Lorenz & Kopf, LLP

(57) ABSTRACT

An exhaust gas recirculation (EGR) flow correction system and method are disclosed for an engine air system with air and EGR inputs to a mixer. The system includes three temperature sensors to measure temperatures of the air input, EGR input, and mixer output; and an air system model computing EGR flow corrections using the three temperatures. Air system can include intake manifold, charge air cooler (CAC), air throttle, EGR cooler and EGR valve, with first sensor between CAC and air throttle, second sensor between EGR cooler and EGR valve, third sensor in intake manifold. Air system model can estimate mass flows through air and EGR inputs, estimate intake manifold temperature at third sensor, estimate intake manifold temperature error, and compute EGR corrections based on temperature error. Air system model can estimate CAC and EGR cooler outlet temperatures, and mixer input temperature.

20 Claims, 7 Drawing Sheets

(51) Int. Cl.
  *F02M 26/19* (2016.01)
  *F02M 26/22* (2016.01)
  *F02M 26/47* (2016.01)
  *F02M 35/10* (2006.01)
  *F02M 26/00* (2016.01)

(52) U.S. Cl.
  CPC ......... *F02D 41/1441* (2013.01); *F02M 26/19* (2016.02); *F02M 26/22* (2016.02); *F02M 26/47* (2016.02); *F02M 35/1038* (2013.01); *F02D 2041/1416* (2013.01); *F02D 2041/1433* (2013.01); *F02D 2200/0402* (2013.01); *F02M 2026/004* (2016.02); *Y02T 10/47* (2013.01)

(58) Field of Classification Search
  CPC .... F02D 2041/1416; F02D 2041/1433; F02M 26/47; F02M 35/1038; F02M 26/19; F02M 26/22; F02M 2026/004
  See application file for complete search history.

(56) References Cited

U.S. PATENT DOCUMENTS

| | | | | |
|---|---|---|---|---|
| 6,058,904 A * | 5/2000 | Kruse | ............... | F02B 41/00 123/295 |
| 6,148,616 A * | 11/2000 | Yoshida | ............... | F02B 37/24 60/605.2 |
| 6,161,519 A * | 12/2000 | Kimura | ............... | F02D 35/026 123/299 |
| 6,230,503 B1 * | 5/2001 | Spletzer | ............... | B01D 53/26 62/271 |
| 6,725,665 B2 * | 4/2004 | Tuschy | ............... | F02C 6/16 60/39.21 |
| 7,117,078 B1 | 10/2006 | Gangopadhyay | | |
| 7,715,976 B1 * | 5/2010 | Xiao | ............... | F02D 41/0072 123/406.48 |
| 9,097,191 B2 * | 8/2015 | Yanakiev | ............... | F02D 41/18 |
| 9,506,420 B2 * | 11/2016 | Ramappan | ............... | F02D 41/0072 |
| 2003/0041845 A1 | 3/2003 | Akao et al. | | |
| 2007/0012040 A1 | 1/2007 | Nitzke et al. | | |
| 2007/0239344 A1 * | 10/2007 | Durand | ............... | F02D 41/005 701/108 |
| 2008/0167790 A1 * | 7/2008 | Kotooka | ............... | F02D 41/0065 701/108 |
| 2010/0043525 A1 | 2/2010 | Recouvreur et al. | | |
| 2010/0199959 A1 * | 8/2010 | Brown | ............... | F02D 41/0052 123/672 |
| 2010/0319444 A1 * | 12/2010 | Miyaura | ............... | F02D 35/026 73/114.49 |
| 2013/0343421 A1 * | 12/2013 | Yanakiev | ............... | F02D 41/18 374/1 |
| 2014/0060506 A1 | 3/2014 | Shaver | | |
| 2014/0222318 A1 * | 8/2014 | Ramappan | ............... | F02D 41/0072 701/108 |

FOREIGN PATENT DOCUMENTS

JP  2005069202 A  *  3/2005
JP  2012255405 A  *  12/2012

* cited by examiner

SYSTEM AND METHOD FOR EXHAUST GAS RECIRCULATION FLOW CORRECTION USING TEMPERATURE MEASUREMENTS

FIELD OF THE DISCLOSURE

The present disclosure relates to engine control systems and methods and more particularly to an engine air system and method that can calculate and correct exhaust gas recirculation flow estimates using system temperature measurements.

BACKGROUND

Internal combustion engines use recirculated exhaust gas to reduce emissions of nitrogen oxides (NOx). Achieving the optimum combination of air and burnt gasses within the engine cylinder prior to the start of combustion on each engine cycle may not be possible due to the dynamics of the air system. To address this problem, control strategies are used to attempt to regulate the intake manifold pressure and the percentage of exhaust gas recirculation (EGR). Traditional engine control strategies use open loop tables and/or proportional-integral-derivative (PID) controllers. These systems tend to have errors under transient conditions because the open loop tables are calibrated for steady state conditions and the closed loop PID controls depend on sensor feedback, which inherently has lag. A physics-based feed forward calculation can be used instead of the open loop tables and PID controls. The feed forward calculation can provide better response under transient conditions, prioritize control objectives, account for system constraints, and be easier to calibrate.

Some engine control systems use an EGR flow Venturi or other flow sensor to estimate an EGR mass flow rate. These flow sensors can be expensive, can be unreliable and can cause additional warranty cost. If other sensors can be used to provide similar performance it may be possible to reduce cost and improve reliability.

It would be desirable to have engine control systems and methods that can estimate EGR mass flow rates using other sensors instead of an EGR flow Venturi or other types of flow sensors.

SUMMARY

An exhaust gas recirculation (EGR) flow correction method is disclosed for an engine air system that includes an air input, an EGR input and a mixer. The EGR flow correction method includes measuring an air temperature of air passing through the air input using a first temperature sensor; measuring an EGR temperature of EGR gases passing through the EGR input using a second temperature sensor; measuring a mixed gas temperature of mixed gases after passing through the mixer using a third temperature sensor, modeling the engine air system using an engine air system model; computing an EGR flow correction using the air temperature, the exhaust gas temperature and the mixed gas temperature; and using the EGR flow correction in the engine air system model. The mixed gases passing through the mixer are a mixture of the air passing through the air input and the EGR gases passing through the EGR input.

The engine air system can also include an intake manifold, and the third temperature sensor can be located in the intake manifold. Modeling the engine air system can include estimating a mass flow through the air input, estimating a mass flow through the EGR input, estimating an intake manifold temperature at the location of the third temperature sensor using the mass flows through the air input and the EGR input. Computing an EGR flow correction can also include computing an intake manifold temperature error based on the mixed gas temperature measured by the third temperature sensor minus the estimated intake manifold gas temperature at the location of the third temperature sensor, and computing the EGR flow correction based on the intake manifold temperature error. Estimating an intake manifold gas temperature at the location of the third temperature sensor can include modeling a conduction heat transfer rate of the intake manifold, modeling a convection heat transfer rate of the intake manifold, and using the conduction heat transfer rate and the convection heat transfer rate of the intake manifold to estimate the intake manifold temperature at the location of the third temperature sensor.

The air input can include a charge air cooler (CAC) and an air throttle. The EGR input can include an EGR cooler and an EGR valve. The first temperature sensor can be located between the CAC and the air throttle, and the second temperature sensor can be located between the EGR cooler and the EGR valve. Modeling the engine air system can include estimating a mass flow through the air throttle, estimating a CAC outlet temperature using the first temperature sensor measurement and the mass flow through the air throttle, estimating a mass flow through the EGR valve, estimating an EGR cooler outlet temperature using the second temperature sensor measurement and the mass flow through the EGR valve, and estimating a mixer input temperature using the estimated CAC outlet temperature, the estimated EGR cooler outlet temperature and the mass flows through the air throttle and the EGR valve.

Estimating a CAC outlet temperature can include estimating an uncorrected CAC outlet temperature using a CAC thermal model and the mass flow through the air throttle, computing a CAC outlet temperature correction using the uncorrected CAC outlet temperature and the first temperature sensor measurement, and computing the CAC outlet temperature using the uncorrected CAC outlet temperature and the CAC outlet temperature correction. Estimating a CAC outlet temperature can also include estimating a CAC outlet velocity using the mass flow through the air throttle and the uncorrected CAC outlet temperature, estimating a CAC outlet sensor time constant using the CAC outlet velocity, estimating an uncorrected CAC outlet sensor temperature using the CAC outlet sensor time constant, and computing the CAC outlet temperature correction using the uncorrected CAC outlet sensor temperature.

Estimating an EGR cooler outlet temperature can include estimating an uncorrected EGR cooler outlet temperature using an EGR cooler thermal model and the mass flow through the EGR valve, computing an EGR cooler outlet temperature correction using the uncorrected EGR cooler outlet temperature and the second temperature sensor measurement, and computing the EGR cooler outlet temperature using the uncorrected EGR cooler outlet temperature and the EGR cooler outlet temperature correction. Estimating an EGR cooler outlet temperature can include estimating an EGR cooler outlet velocity using the mass flow through the EGR valve and the uncorrected EGR cooler outlet temperature, estimating an EGR cooler outlet sensor time constant using the EGR cooler outlet velocity, estimating an uncorrected EGR cooler outlet sensor temperature using the EGR cooler outlet sensor time constant, and computing the EGR cooler outlet temperature correction using the uncorrected EGR cooler outlet sensor temperature.

Modeling the engine air system can also include modeling a convection heat transfer rate of the mixer; estimating a mixer output temperature using the mixer input temperature, the convection heat transfer rate of the mixer, and the mass flows through the air throttle and the EGR valve; and using the mixer output temperature to estimate the intake manifold temperature at the location of the third temperature sensor.

An exhaust gas recirculation (EGR) flow correction system is disclosed for an engine air system comprising an air input, an EGR input and a mixer. The EGR flow correction system includes three temperature sensors and an engine air system model. The first temperature sensor measures the temperature of air passing through the air input, the second temperature sensor measures the temperature of EGR gases passing through the EGR input, and third temperature sensor to measure the temperature of mixed gases after passing through the mixer. The mixed gas is a mixture of the air passing through the air input and the EGR gases passing through the EGR input. The engine air system model models the engine air system using an EGR flow correction; and uses the first, second and third temperature sensor measurements to update the EGR flow correction.

The engine air system further can also include an intake manifold, the air input can include a charge air cooler (CAC) and an air throttle, and the EGR input can include an EGR cooler and an EGR valve. The first temperature sensor can be located between the CAC and the air throttle. The second temperature sensor can be located between the EGR cooler and the EGR valve. The third temperature sensor can be located in the intake manifold. The engine air system model can include an air throttle mass flow model to estimate a mass flow through the air throttle; a CAC thermal model to estimate a CAC outlet temperature based on the first temperature sensor measurement and the mass flow through the air throttle; an EGR valve mass flow model to estimate a mass flow through the EGR valve; an EGR cooler thermal model to estimate an EGR cooler outlet temperature based on the second temperature sensor measurement and the mass flow through the EGR valve; a mixer input model to estimate a mixer input temperature based on the estimated CAC outlet temperature, the estimated EGR cooler outlet temperature and the mass flows through the air throttle and the EGR valve; a mixer thermal model to estimate a mixer output temperature based on the estimated mixer input temperature and the mass flows through the air throttle and the EGR valve; an intake manifold thermal model to estimate an intake manifold temperature at the location of the third temperature sensor based on the mixer output temperature and the mass flows through the air throttle and the EGR valve; and an EGR flow correction model to compute the EGR flow correction based on the difference between the third temperature sensor reading and the estimated intake manifold temperature at the location of the third temperature sensor.

The intake manifold thermal model can include an intake manifold conduction model to model heat conduction of the intake manifold, and an intake manifold convection model to model heat convection of the intake manifold. The CAC thermal model can include a CAC effectiveness model; and the EGR cooler thermal model can include an EGR cooler effectiveness model.

The above and other features will become apparent from the following description and the attached drawings.

BRIEF DESCRIPTION OF THE DRAWINGS

The detailed description of the drawing refers to the accompanying figures in which.

DETAILED DESCRIPTION

Internal combustion engines use recirculated exhaust gas to reduce emissions of nitrogen oxides (NOx). Achieving the optimum combination of air and burnt gasses within the engine cylinder prior to the start of combustion on each engine cycle may not be possible due to the dynamics of the air system. A physics-based control strategy can be used that prioritizes the control objectives of the air system and regulates the flow of fresh air and exhaust gas recirculation (EGR) under transient conditions. A state observer can be used to model the air system states, measured states can be compared to estimated states, and corrections can be made to the observer model to minimize errors. The model information and model corrections can be used in feed forward calculations to determine the desired air throttle position and the desired EGR valve position. Feed forward control achieved using this method can provide fast and accurate control within the constraints of the system.

Figure 1:
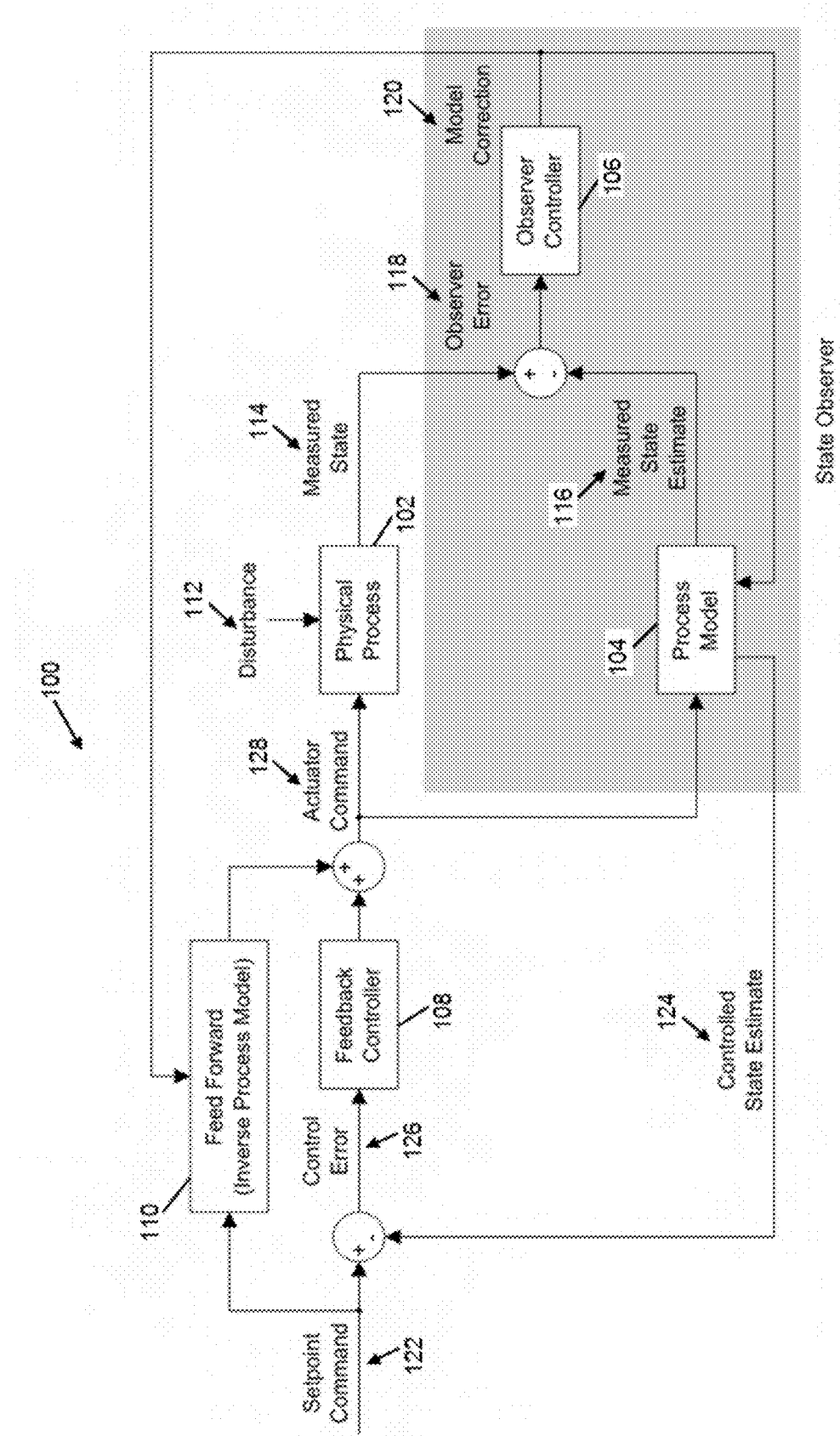
FIG. 1 illustrates an exemplary observer based control system including a physical process and a process model.

A state observer is a math model of a process that is being controlled. The model can be run in an electronic control unit (ECU) of an engine. FIG. 1 illustrates an exemplary observer based control system 100 that includes a physical process 102 and a process model 104. The process model 104 calculates state estimates, for example pressures, temperatures, speeds, and positions. Measured states from the physical process 102 can be compared with the state estimates from the process model 104, and corrections can be made based on the differences.

The exemplary observer based control system 100 includes the physical process 102 that is being modeled by the process model 104, as well as an observer controller 106, a feedback controller 108 and a feed forward controller 110. The feed forward controller 110 is an inverse of the process model 104. The process model 104 is not a perfect model of the physical process 102 which experiences disturbances 112 that are not accounted for by the process model 104. Sensors monitoring the physical process 102 provide a measured state 114, and the process model 104 outputs a measured state estimate 116. The difference between the measured state 114 and the measured state estimate 116 provides an observer error 118 that is input to the observer controller 106. The observer controller 106 processes the observer error 118 and generates a model correction 120 that is input to the process model 104 and to the feed forward controller 110. Setpoint commands 122 indicating desired values for process parameters are input to the control system 100. The setpoint commands 122 are input to the feed forward controller 110. The difference between the setpoint commands 122 and a controlled state estimate 124 generated by the process model 104 produces a control error 126 that is input to the feedback controller 108. The sum of the outputs of the feedback controller 108 and the feed forward controller 110 produces actuator commands 128 that are input to the physical process 102 and the process model 104.

There are several advantages to using a state observer within a control system. The observer can provide estimates of states that are difficult, expensive, or impossible to measure directly. Since the process model 104 provides state estimates, fewer sensors may be required. The process model 104 with corrections from the observer controller 106 can be used in the feed forward calculation 110 for the actuator commands 128. This inverse process model 110 has desired states or setpoints 122 as the inputs, and the corresponding actuator commands 128 are the outputs. Feed forward control of this type provides fast response and can reduce the feedback control complexity. This method can make it easier to implement system constraints because the constraints may be treated as limits within the feed forward and feedback control eliminating the need for separate controllers modifying the actuator commands. Using an observer in the control system may also improve operation in non-standard conditions because the model can predict the effects of changes and adjust the controls as needed.

Since the observer model runs in the ECU, it needs to be efficient at calculating state estimates. Finite element models and one-dimensional wave dynamic models are typically too complex to run within the ECU at real time. Models capable or running within the ECU or in off line simulations with sufficient fidelity for use with a control system are typically mean value lumped parameter models. A mean value model calculates the mass flow through the engine as being continuous without the pulsating effects of a real engine. If needed, individual cylinder masses can be calculated for each cylinder event from the mean flow.

Flow into the engine cylinders can be predicted using the speed density method which uses engine speed and engine displacement to determine an ideal volumetric flow rate. A correction factor called the volumetric efficiency can then be applied to provide an estimate of the volumetric flow rate. Finally, the volumetric flow rate can be multiplied by the intake manifold density to determine the mass flow into the engine cylinders. This is sometimes called the speed density mass flow.

Engine manifolds and pipes can be modeled using the lumped parameter (zero dimensional) method. Using this method, the entire volume of the manifold is assumed to have uniform pressure, temperature, and mixture composition; all mass flows out of the manifold are assumed to have the same pressure, temperature, and mixture composition as the contents of the manifold; and the pipes are assumed to have no wave dynamics or transport delays.

Figure 2:
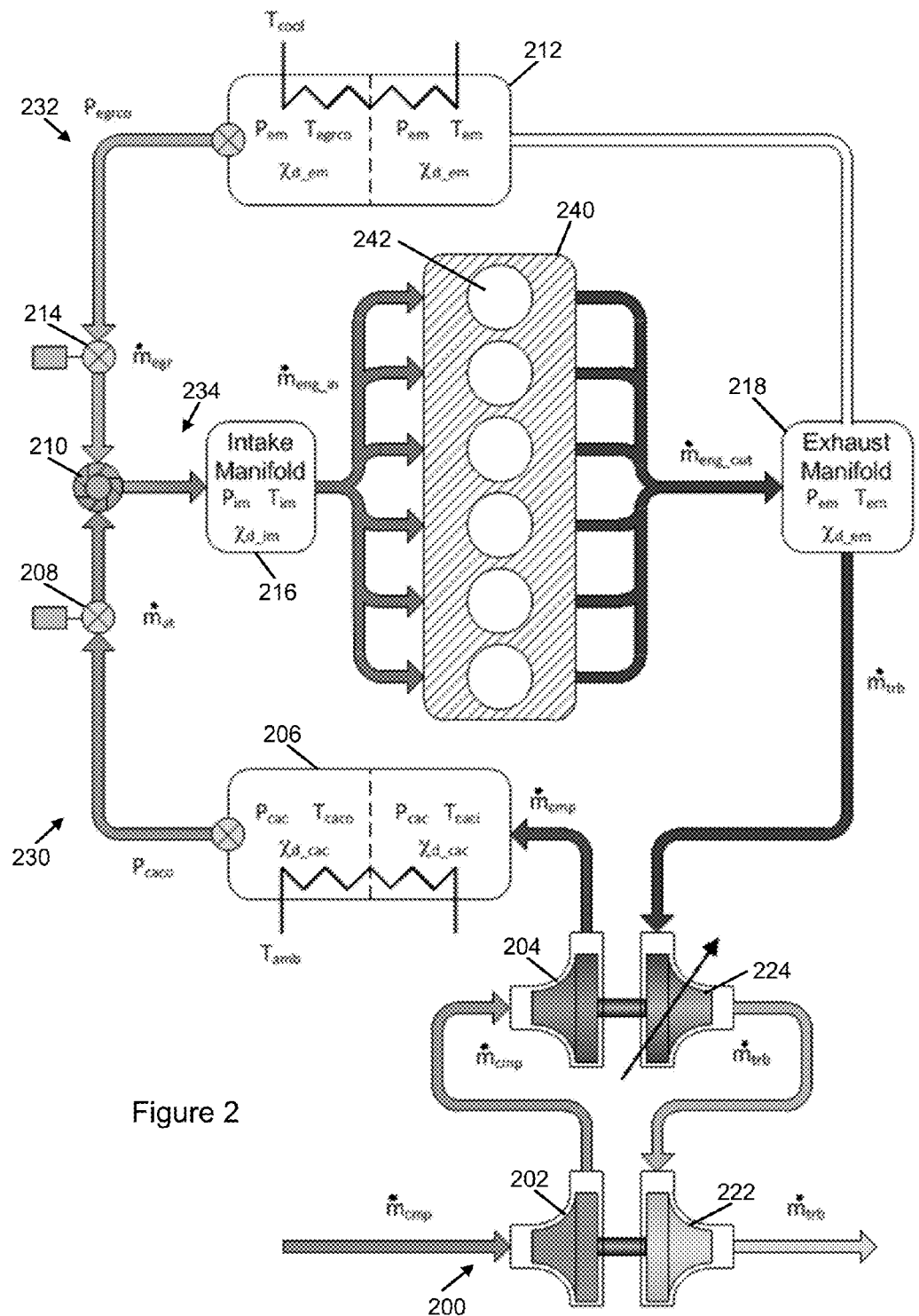
FIG. 2 illustrates some of the components, state variables, mass flows, and sensors used in an exemplary air system model.

FIG. 2 illustrates some of the components, state variables, mass flows, and sensors used in an exemplary air system model. Air enters the system at a compressor inlet 200 into a low pressure compressor 202. Sensors can be located at the compressor inlet 200 to monitor various parameters, for example compressor inlet temperature, pressure and humidity. The low pressure compressor 202 compresses the air and sends it to a high pressure compressor 204 where it is further compressed. The compressed air from the high pressure compressor 204 is input to a charge air cooler (CAC) 206. Various parameters, for example, pressure, temperature and diluent mass fraction in the CAC 206 can be monitored. The output from the CAC 206 passes through an air throttle 208 and into a mixer 210. Sensors can be positioned between the CAC 206 and the air throttle 208 to monitor the CAC outlet temperature and pressure as well as other parameters. A position sensor can be used to monitor the position of the air throttle 208.

The mixer 210 mixes fresh air from the CAC 206 and recirculated exhaust gasses from an exhaust gas recirculation (EGR) cooler 212. The mixed gasses from the mixer 210 are fed to an engine intake manifold 216, and the output of the engine intake manifold 216 is divided between cylinders 242 of an engine 240. The illustration of FIG. 2 shows an engine 240 with six cylinders 242. Various parameters, for example, pressure, temperature and diluent mass fraction at the intake manifold 216 can be monitored.

The exhaust gasses of the cylinders 242 of the engine 240 are fed to an engine exhaust manifold 218. The exhaust gasses from the exhaust manifold 218 are either recirculated through the EGR cooler 212 or expelled from the system. Various parameters, for example, pressure, temperature and diluent mass fraction at the exhaust manifold 218 can be monitored.

The output from the EGR cooler 212 passes through an EGR valve 214 and into the mixer 210. Various parameters, for example, pressure, temperature and diluent mass fraction in the EGR cooler 212 can be monitored. Sensors can be positioned between the EGR cooler 212 and the EGR valve 214 to monitor the EGR cooler outlet temperature and pressure as well as other parameters. A position sensor can be used to monitor the position of the EGR valve 214. An EGR flow Venturi can be located between the EGR valve 214 and the mixer 210.

The exhaust gasses expelled from the exhaust manifold 218 pass through a high pressure turbine 224 and a low pressure turbine 222. The high pressure turbine 224 can be a variable geometry turbocharger (VGT) with a vane position sensor to monitor the vane positions. Various other parameters, for example, pressure, temperature, turbocharger speed can be monitored. An exhaust back pressure at the output of the low pressure turbine 222 can also be monitored.

The exemplary air system model of FIG. 2 at the mixer 210 can be characterized as air entering through an air input 230 and EGR gases entering through an EGR input 232. The air and EGR gases entering the mixer 210 are mixed and the mixed gas exits through a mixer output 234. The air input 230 can include the CAC 206 and the air throttle 208. The EGR input 232 can include the EGR cooler 212 and the EGR valve 214. The mixer output 234 can include the intake manifold 216. Some embodiments of an air system may not include all of these components, for example some systems may not include an air throttle 208. The following description applies to an air system with all of the above components but can easily be extended by one of skill in the art to related systems. For example, in an embodiment where the air input 230 only includes the CAC 206, the mass flows and other parameters at the output of the CAC 206 or at a location between the output of the CAC 206 and the mixer 210 can be used instead of the corresponding parameters described below for the air throttle 208.

The system shown in FIG. 2 can be modeled by state equations that are based on the conservation of mass, energy, and momentum. Some relationships can be approximated using first order filters. Each state equation describes a rate of change. The state value at any given time can be determined by integration of the state equation. Within the ECU, each state can be given an initial condition and the state value at each time step of the controller can be updated using numeric integration.

The rate of change of mass in the charge air cooler (CAC) 206 can be modeled by the difference between the rate of change of mass coming in from the compressors 202, 204 and the rate of change of mass going out to the air throttle 208 as:

$$\frac{dm_{cac}}{dt} = \dot{m}_{cmp} - \dot{m}_{at} \tag{1}$$

The rate of change of mass in the intake manifold 216 can be modeled by the sum of the rate of change of mass coming in from the air throttle 208 and the EGR valve 214 minus the rate of change of mass going into the engine 240 as:

$$\frac{dm_{im}}{dt} = \dot{m}_{at} + \dot{m}_{egr} - \dot{m}_{eng\_in} \tag{2}$$

The rate of change of diluent mass in the intake manifold 216 can be modeled as the sum of the rate of change in mass coming from the air throttle 208 times the mass fraction of diluent in the charge air cooler 206 (can assume same as the mass fraction of water in ambient air due to humidity) plus the rate of change of mass coming in from the EGR valve 214 times the mass fraction of diluent in the exhaust manifold 218, minus the rate of change of mass going into the engine 240 times the mass fraction of diluent in the intake manifold 216 as:

$$\frac{dm_{d\_im}}{dt} = \dot{m}_{at} \cdot \chi_{d\_cac} + \dot{m}_{egr} \cdot \chi_{d\_em} - \dot{m}_{eng\_in} \cdot \chi_{d\_im} \tag{3}$$

The term diluent is used to describe everything other than dry air (or fuel) that is included in a mixture.

The rate of change of mass in the exhaust manifold 218 can be modeled by the rate of change of mass coming out of the engine 240 minus the rate of change of mass going into the EGR cooler 212 and the rate of change of mass going into the turbines 222, 224 as:

$$\frac{dm_{em}}{dt} = \dot{m}_{eng\_out} - \dot{m}_{egr} - \dot{m}_{trb} \tag{4}$$

The rate of change of diluent mass in the exhaust manifold 218 can be modeled by the difference between the rate of change of mass coming in from the engine 240 times the mass fraction of diluent coming in from the engine 240 and the sum of the rates of change of mass going into the EGR cooler 212 and the turbines 222, 224 times the mass fraction of diluent in the exhaust manifold 218 as:

$$\frac{dm_{d\_em}}{dt} = \dot{m}_{eng\_out} \cdot \chi_{d\_eng\_out} - (\dot{m}_{egr} + \dot{m}_{trb}) \cdot \chi_{d\_em} \tag{5}$$

The rate of change of temperature at the output of the CAC 206 can be modeled by the difference between the steady state temperature at the output of the CAC 206 and the estimated temperature at the output of the CAC 206 divided by a time constant for the CAC 206 as:

$$\frac{dT_{caco}}{dt} = \frac{(T_{caco\_ss} - T_{caco})}{\tau_{cac}} \tag{6}$$

The rate of change of temperature at the output of the EGR cooler 212 can be modeled by the difference between the steady state temperature at the output of the EGR cooler 212 and the estimated temperature at the output of the EGR cooler 212 divided by a time constant for the EGR cooler 212 as:

$$\frac{dT_{egrco}}{dt} = \frac{(T_{egrco\_ss} - T_{egrco})}{\tau_{egrc}} \tag{7}$$

The steady state cooler outlet temperatures $T_{caco\_ss}$ and $T_{egrco\_ss}$ can be calculated using a heat exchanger effectiveness model. The effectiveness can be calibrated using a table with mass flow as the input. An effectiveness of one means the cooler outlet temperature is equal to the temperature of the cooling fluid, and an effectiveness of zero means there is no change in temperature between the cooler inlet and outlet.

The rate of temperature change of the intake manifold 216 can be calculated using the mass flows in and out, the temperature in and out, and the change in mass within the intake manifold 216. The rate of change of temperature of the intake manifold 216 can be modeled by the rate of change of mass at the air throttle 208 times $C_P$ times the temperature at the output of the CAC 206 plus the rate of change of mass at the EGR valve 214 times $C_P$ times the temperature at the output of the EGR cooler 212 minus the rate of change of mass going into the engine 240 times $C_P$ times the temperature of the intake manifold 216 minus the rate of change of mass in the intake manifold 216 times $C_V$ times the temperature of the intake manifold 216, all divided by the product of the mass at the intake manifold 216 times $C_V$ as:

$$\frac{dT_{im}}{dt} = \frac{\dot{m}_{at} \cdot C_P \cdot T_{caco} + \dot{m}_{egr} \cdot C_P \cdot T_{egrco} - \dot{m}_{eng\_in} \cdot C_P \cdot T_{im} - \frac{dm_{im}}{dt} \cdot C_v \cdot T_{im}}{m_{im} \cdot C_v} \tag{8}$$

where $C_P$ is the specific heat at constant volume, and $C_V$ is the specific heat at constant pressure. The specific heat can be measured experimentally at constant volume or constant pressure. $C_P$ is greater than $C_V$ because as the mixture is heated at constant pressure it expands doing work on the container or the fluid around it. $C_P$ can be used to calculate energy flow into or out of the control volume. $C_V$ can be used to calculate the change in energy within the control volume due to changes in temperate and mass.

The rate of change of temperature at the exhaust manifold 218 can be modeled by the difference between the temperature at the output of the engine 240 and the temperature of the exhaust manifold 218 divided by a time constant for the exhaust manifold 218 as:

$$\frac{dT_{em}}{dt} = \frac{(T_{eng\_out} - T_{em})}{\tau_{em}} \tag{9}$$

The rate of change in low pressure turbocharger speed can be modeled by the sum of the torques on the low pressure turbocharger shaft and blades divided by the inertia of the low pressure turbocharger shaft and blades (Newton's second law for rotation). The sum of the torques can be modeled by the difference between low pressure turbine power and low pressure compressor power divided by the low pressure turbocharger speed. The turbine power (or compressor power) can be calculated from the change in enthalpy of the gas as it goes through the turbine (or compressor). The enthalpy change is equal to the mass flow rate times the specific heat at constant pressure ($C_P$) times the delta temperature across the turbine (or compressor). When turbocharger speed is expressed in units of revolutions per minute (rpm), it must be converted to radians per second (rad/s) using a factor of $\pi/30$. The inverse of this factor is squared in equation (10) to convert $N_{lpt}$ in the denominator and also to express the solution $dN_{lpt}/dt$ in units of revolutions per minute per second (rpm/s).

$$\frac{dN_{lpt}}{dt} = \frac{1}{J_{lpt}} \cdot \left( \frac{\dot{W}_{lp\_trb} - \dot{W}_{lp\_cmp}}{N_{lpt}} \right) \cdot \left( \frac{30/\pi \text{ rpm}}{\text{rad/s}} \right)^2 \quad (10)$$

The rate of change in high pressure turbocharger speed can be modeled by the sum of the torques on the high pressure turbocharger shaft and blades divided by the inertia of the high pressure turbocharger shaft and blades (Newton's second law for rotation). The sum of the torques can be modeled by the difference between high pressure turbine power and high pressure compressor power divided by the high pressure turbocharger speed. The turbine power (or compressor power) can be calculated from the change in enthalpy of the gas as it goes through the turbine (or compressor). The enthalpy change is equal to the mass flow rate times the specific heat at constant pressure ($C_P$) times the delta temperature across the turbine (or compressor). When turbocharger speed is expressed in units or revolutions per minute (rpm) it must be converted to radians per second (rad/s) using a factor of $\pi/30$. The inverse of this factor is squared in equation (11) to convert $N_{hpt}$ in the denominator and also to express the solution $dN_{hpt}/dt$ in units of revolutions per minute per second (rpm/s).

$$\frac{dN_{hpt}}{dt} = \frac{1}{J_{hpt}} \cdot \left( \frac{\dot{W}_{hp\_trb} - \dot{W}_{hb\_cmp}}{N_{hpt}} \right) \cdot \left( \frac{30/\pi \text{ rpm}}{\text{rad/s}} \right)^2 \quad (11)$$

The air throttle and EGR valve can be modeled using the compressible gas flow equation for an orifice as:

$$\dot{m}_{at} = C_{d\_at}(u_{at}) \cdot A_{at} \cdot \frac{P_{caco}}{\sqrt{R \cdot T_{caco}}} \cdot \Psi\left(\frac{P_{im}}{P_{caco}}\right), \quad (12)$$

and $$\dot{m}_{egr} = C_{d\_egr}(u_{egr}) \cdot A_{egr} \cdot \frac{P_{egrco}}{\sqrt{R \cdot T_{egrco}}} \cdot \Psi\left(\frac{P_{im}}{P_{egrco}}\right) \quad (13)$$

where $C_{d\_at}$ and $C_{d\_egr}$ are the discharge coefficients for the air throttle 208 and the EGR valve 214, respectively, which can be calibrated using a table with actuator position ($u_{at}$ and $u_{egr}$, respectively) as the input. The fresh air flow correction factor $CF_{air}$ (calculated below in equation (26)) and the EGR valve flow correction factor $CF_{egrv}$ (calculated below in equation (91)) can be used to multiply the result of the air throttle and EGR valve mass flow equations (12) and (13), respectively, as:

$$\dot{m}_{at} = CF_{air} \cdot C_{d\_at}(u_{at}) \cdot A_{at} \cdot \frac{P_{caco}}{\sqrt{R \cdot T_{caco}}} \cdot \Psi\left(\frac{P_{im}}{P_{caco}}\right), \quad (12A)$$

and $$\dot{m}_{egr} = CF_{egrv} \cdot C_{d\_egr}(u_{egr}) \cdot A_{egr} \cdot \frac{P_{egrco}}{\sqrt{R \cdot T_{egrco}}} \cdot \Psi\left(\frac{P_{im}}{P_{egrco}}\right) \quad (13A)$$

The areas A can be calculated using the actuator bore diameters. The term R is the gas constant. The compressible gas flow factor $\Psi$ is a function of pressure ratio and can be calibrated using a table with pressure ratio as the input. The table values can be calculated off-line using the following equations:

$$\Psi\left(\frac{P_{out}}{P_{in}}\right) = \left(\frac{P_{out}}{P_{in}}\right)^{\frac{1}{k}} \cdot \sqrt{\frac{2 \cdot k}{k+1} \cdot \left(1 - \left(\frac{P_{out}}{P_{in}}\right)^{\frac{k-1}{k}}\right)} \quad (14)$$

for $$\left(\frac{P_{out}}{P_{in}}\right) \geq \left(\frac{2}{k+1}\right)^{\frac{k}{k-1}}$$

$$\Psi\left(\frac{P_{out}}{P_{in}}\right) = \sqrt{k \cdot \left(\frac{2}{k+1}\right)^{\frac{k+1}{k-1}}} \quad (15)$$

for $$\left(\frac{P_{out}}{P_{in}}\right) < \left(\frac{2}{k+1}\right)^{\frac{k}{k-1}}$$

where the term k represents the ratio of specific heats $C_P/C_V$.

The mass flow calculation for the charge air cooler 206 and the EGR cooler 212 can be based on the Darcy-Weisbach equation:

$$h_f = f \cdot \frac{L}{d} \cdot \frac{V^2}{2 \cdot g} \quad (16)$$

This relationship was developed for a pipe, but the structure of the coolers 206, 212 are similar. The term $h_f$ is the pipe head loss, f is the Darcy friction factor, L is the pipe length, d is the diameter, V is velocity, and g is the gravitational constant.

Pressure drop is related to the head loss by:

$$\Delta P = \rho \cdot g \cdot h_f \quad (17)$$

Substituting (16) into (17) results in:

$$\Delta P = f \cdot \frac{L}{d} \cdot \frac{\rho \cdot V^2}{2} \quad (18)$$

Velocity and mass flow are related by:

$$V = \frac{\dot{m}}{\rho \cdot A} \quad (19)$$

Substituting (19) into (18) results in:

$$\Delta P = f \cdot \frac{L}{d} \cdot \frac{1}{2 \cdot A^2} \cdot \frac{\dot{m}^2}{\rho} \quad (20)$$

Equation (20) shows a relationship between mass flow squared over density and the pressure drop across the cooler. The remaining terms are constant. An empirical model of this form can be fit to experimental data. The experimental data may also show a relationship to temperature change across the cooler. This finding is reasonable because the density is changing as the gasses flow through the cooler and not constant as indicated by equation (20). These relationships can be calibrated using a regression model or tables of the following form, where delta pressure and delta temperature are the inputs:

$$\frac{\dot{m}_{cac}^2}{\rho_{cac\_avg}} = CACMassFlowSquaredOverDensityTable(\Delta P_{cac}, \Delta T_{cac}) \quad (21)$$

$$\frac{\dot{m}_{egrc}^2}{\rho_{egrc\_avg}} = EGRCMassFlowSquaredOverDensityTable(\Delta P_{egrc}, \Delta T_{egrc}) \quad (22)$$

The inlet and outlet temperatures of each cooler 206, 212 can be modeled and/or the temperatures can be measured. Half of the cooler can be assumed to be at the inlet temperature and half of the cooler can be assumed to be at the outlet temperature. The average cooler density can be calculated using the average temperature and average pressure. Assuming a linear drop in pressure and temperate across the cooler, the average temperature and average pressure can be calculated by averaging inlet and outlet values. The mass flow can be calculated by multiplying the average density by the table output and then taking the square root. The fresh air flow correction factor $CF_{air}$ (calculated below in equation (26)) and the EGR cooler flow correction factor $CF_{egrc}$ (calculated below in equation (92)) can be included in these mass flow calculations for the coolers as:

$$\dot{m}_{cac} = CF_{air} \cdot \sqrt{\rho_{cac\_avg} \cdot CACFlowSqOverDensityTbl(\Delta P_{cac}, \Delta T_{cac})} \quad (21A)$$

$$\dot{m}_{egrc} = CF_{egrc} \cdot \sqrt{\rho_{egrc\_avg} \cdot EGRCFlowSqOverDensityTbl(\Delta P_{egrc}, \Delta T_{egrc})} \quad (22A)$$

The mass flow through the charge air cooler 206 and the air throttle 208 can be assumed to be the same. The outlet pressure of the charge air cooler 206 can be estimated using a binary search algorithm that searches for a charge air cooler outlet pressure that results in the mass flow of the charge air cooler 206 and the mass flow of the air throttle 208 being the same. The outlet pressure of the charge air cooler 206 should be between the inlet pressure of the charge air cooler 206 and the pressure of the intake manifold 216. This entire range does not have to be searched at every ECU time step. To reduce processor load, the previous solution can be used as a starting point and only a small range searched around that value. Even though the solution may not be within the search range under extreme transient conditions, the solution should converge within a few ECU time steps.

The calculation can begin by evaluating mass flow through the charge air cooler 206 and the air throttle 208 with the previous outlet pressure of the charge air cooler 206. If the mass flow of the air throttle 208 is lower than the mass flow of the charge air cooler 206, then the outlet pressure of the charge air cooler 206 can be adjusted up by a percentage of the maximum search range (charge air cooler inlet pressure-intake manifold pressure). Otherwise, the outlet pressure of the charge air cooler 206 can be adjusted down by a percentage of the maximum search range. This process can be repeated with percentage adjustments of, for example, 4, 2, 1, 0.5 and 0.25 percent of the maximum search range (charge air cooler inlet pressure-intake manifold pressure).

The same type of iterative solution technique can be used for the mass flow through the EGR cooler 212 and the EGR valve 214.

The compressors 202, 204 and turbines 222, 224 can be modeled using mass flow tables and efficiency tables (turbocharger maps). The pressure ratio across the compressors (or turbines) and the turbocharger speed can be used to determine the mass flow and efficiency. These calculations can include corrections for temperature and pressure when not operating at the standard conditions for the turbocharger maps. The efficiency can be used to calculate the outlet temperature and the turbocharger shaft power. The turbocharger speed can be calculated using the compressor power, turbine power, and inertia as shown by equations (10) and (11).

A variable geometry turbocharger (VGT) 224 has adjustable vanes on the turbine that change the turbine performance characteristics. Moving the vanes in the closing direction causes the pressure of the exhaust manifold 218 to increase. Up to some point this also causes the turbine power to increase, which causes the turbocharger to speed up and provide more compressor flow. If the turbine vanes are closed too much the turbine flow can be "choked" and the power may drop.

To model the turbine operation at various vane positions, multiple turbine tables can be used that characterize the turbine performance at different vane positions. For operation at vane positions between the tables, interpolation can be used to determine the mass flow and efficiency.

Two stage turbochargers have two compressors in series and two turbines in series, as shown in FIG. 2. The interstage volume between the compressors 202, 204 and between the turbines 222, 224 is small, making it difficult to dynamically model the pressure. A small change in flow causes a large change in pressure. At the time steps used in the ECU, the modeled interstage pressure can become numerically unstable. A flow change over one time step can cause a change in pressure that in turn causes another change in flow and pressure causing the modelled pressures and flows to oscillate. This can be overcome by using a very small time step but that is not typically practical for calculations within an ECU.

To eliminate the numeric instability, the flow through each compressor 202, 204 can be assumed to be the same. Likewise, the flow through each turbine 222, 224 can be assumed to be the same. The interstage pressure can then be solved iteratively using a binary search algorithm that adjusts the interstage pressure until the flow through each compressor (or turbine) is the same. This is similar to the search algorithm described above for the charge air cooler 206 and the air throttle 208.

The observer controller can make corrections to the air system model so that the estimated states match the measured states. The modeled states may have error due to modeling errors, engine variation, changing engine characteristics over time, air leaks and other sources. Three examples of model corrections are: fresh air mass flow correction term, EGR mass flow correction term, and turbine mass flow correction term. These correction terms can be calculated within the observer controller based on: intake manifold pressure error, EGR mass flow error, and exhaust manifold pressure error, respectively. The model corrections can be multiplicative correction factors, additive or offset correction factors or other types of correction terms. Exemplary correction term calculations are shown below. The correction terms can be applied to the observer model as well as to the models used in actuator control calculations.

A fresh air flow correction factor $CF_{air}$ can be applied as a correction to the compressor mass flow estimates, charge air cooler mass flow estimates, and air throttle mass flow estimates. The pressure error at the intake manifold 216 is the difference between the modelled and measured pressures:

$$P_{im\_obs\_error} = P_{im\_sensor} - P_{im} \quad (23)$$

A proportional air flow correction factor $CF_{air\_prop}$ can be calculated as a constant times the pressure error at the intake manifold 216:

$$CF_{air\_prop} = K_{p\_im\_press\_obs} \cdot P_{im\_obs\_error} \quad (24)$$

An integral air flow intake correction factor $CF_{air\_int}$ can also be calculated based on the pressure error at the intake manifold 216 as:

$$CF_{air\_int} = K_{i\_im\_press\_obs} \cdot P_{im\_obs\_error} + CF_{air\_int\_previous} \quad (25)$$

A fresh air flow correction factor $CF_{air}$ can be estimated by the sum of these air flow correction factors:

$$CF_{air} = CF_{air\_prop} + CF_{air\_int} \quad (26)$$

A turbine mass flow correction factor $CF_{trb}$ can be applied as a correction to the turbine mass flow estimates. The pressure error at the exhaust manifold 218 is the difference between the modelled and measured pressures:

$$P_{em\_obs\_error} = P_{em\_sensor} - P_{em} \quad (27)$$

A proportional turbine correction factor $CF_{trb\_prop}$ can be calculated as a constant times the pressure error at the exhaust manifold 218:

$$CF_{trb\_prop} = -K_{p\_em\_press\_obs} \cdot P_{em\_obs\_error} \quad (28)$$

An integral turbine intake correction factor $CF_{trb\_int}$ can also be calculated based on the pressure error at the exhaust manifold 218 as:

$$CF_{trb\_int} = -K_{i\_em\_press\_obs} \cdot P_{em\_obs\_error} + CF_{trb\_int\_previous} \quad (29)$$

A turbine intake correction factor $CF_{trb}$ can be estimated by the sum of these turbine correction factors:

$$CF_{trb} = CF_{trb\_prop} + CF_{trb\_int} \quad (30)$$

Figure 3:
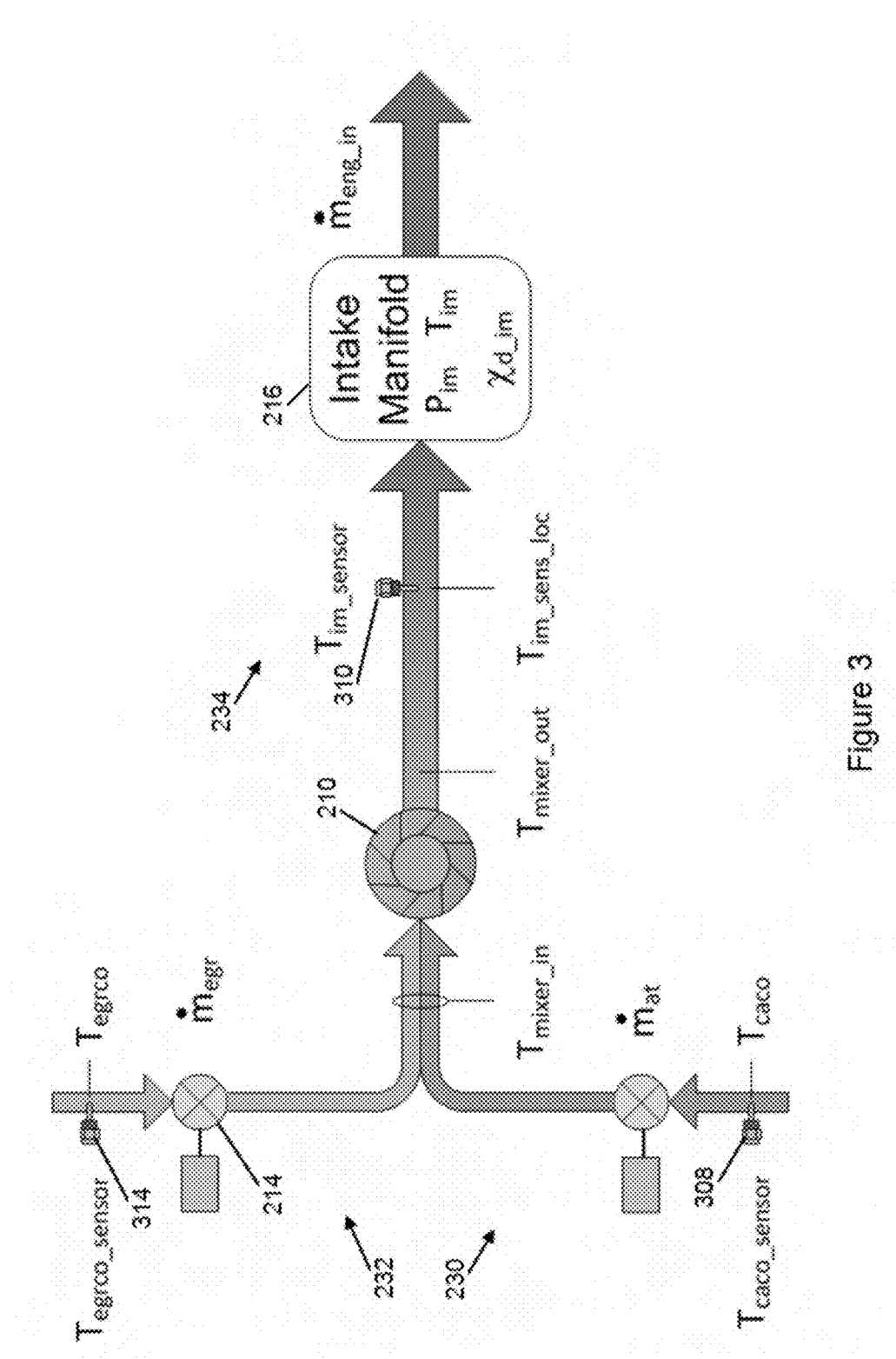
FIG. 3 illustrates exemplary temperature sensor locations for a three temperature EGR flow correction model using a charge air cooler outlet temperature sensor, an EGR cooler outlet temperature sensor, and an intake manifold temperature sensor.

Additional model corrections can be made using temperature sensors shown in FIG. 3. Three sensors are shown: a charge air cooler outlet temperature sensor $T_{caco\_sensor}$ 308 on the air input 230, an EGR cooler outlet temperature sensor $T_{egrco\_sensor}$ 314 on the EGR input 232, and an intake manifold temperature sensor $T_{im\_sensor}$ 310 on the mixer output 234. Temperature information from these sensors can be used to improve the EGR mass flow estimate.

The two cooler outlet temperature sensors 308, 314 can be used to calculate model corrections to improve the accuracy of the charge air cooler 206 outlet temperature estimate $T_{caco}$ and the EGR cooler 212 outlet temperature estimate $T_{egrco}$. This also improves the temperature estimate of the mixture when the mass flow through the air throttle 208 and the mass flow through the EGR valve 214 are combined. In FIG. 3, the temperature of this mixture is shown as the mixer 210 inlet temperature estimate $T_{mixer\_in}$ and it represents the ideal temperature of the mixture if there were no heat transfer during the mixing process (adiabatic mixing). The actual process will have some heat transfer with the metal surfaces of the mixer 210 and the intake manifold 216.

The mixer 210 is designed to provide a uniform mixture of EGR and fresh air to the intake manifold 216 so that each cylinder 242 of the engine 240 receives a mixture with the same percentage of EGR. The mixer 210 may be designed in various ways, for example the EGR may enter at the center of the fresh air flow through pipe, or the EGR may enter through holes around the circumference of the fresh air passage, or other designs may be used. Fins may also be used in the mixer 210 to improve mixing of the flows by creating turbulence. Although heat transfer occurs before, during, and after the mixing process, within this model the mixing can be assumed to occur first so that an ideal mixture temperature can be calculated. This temperature is shown as the inlet temperature estimate $T_{mixer\_in}$ of the mixer 210.

A convection heat transfer model can be used for the mixer 210 to calculate the change in temperature as the flow passes through the mixer 210, resulting in an outlet temperature estimate $T_{mixer\_out}$ of the mixer 210.

A convection heat transfer model can be used for the intake manifold 216 to calculate the change in temperature as the flow passes through the intake manifold 216 to an intake manifold sensor location, resulting in a temperature estimate for the intake manifold 216 at the sensor location $T_{im\_sens\_loc}$.

The intake manifold temperature estimate at the sensor location $T_{im\_sens\_loc}$ along with the intake manifold temperature sensor value $T_{im\_sensor}$ can be used to calculate an EGR valve flow correction factor $CF_{egrv}$ and an EGR cooler flow correction factor $CF_{egrc}$.

The EGR flow rate can be estimated using flow models of the EGR valve and the EGR cooler. Flow estimation using these models depends on accurate measurement of manifold pressures and accurate flow restriction models. To reduce the sensitivity to pressure measurement error and changes in component flow restriction, a correction can be made to the EGR flow estimate using the three temperature sensors 308, 310, 314. By modeling the temperatures of the gas flows, heat transfers, and the measured response of the sensors it is possible to estimate what the temperature should be at the sensor locations for the calculated EGR flow. If the intake manifold temperature estimate does not match the measured temperature it could be due to changes in restriction, measurement error, or modeling error. Based on the temperature estimate and measured temperature, corrections can be made to the EGR flow model to improve the EGR flow estimate without needing an actual flow sensor.

Figure 4:
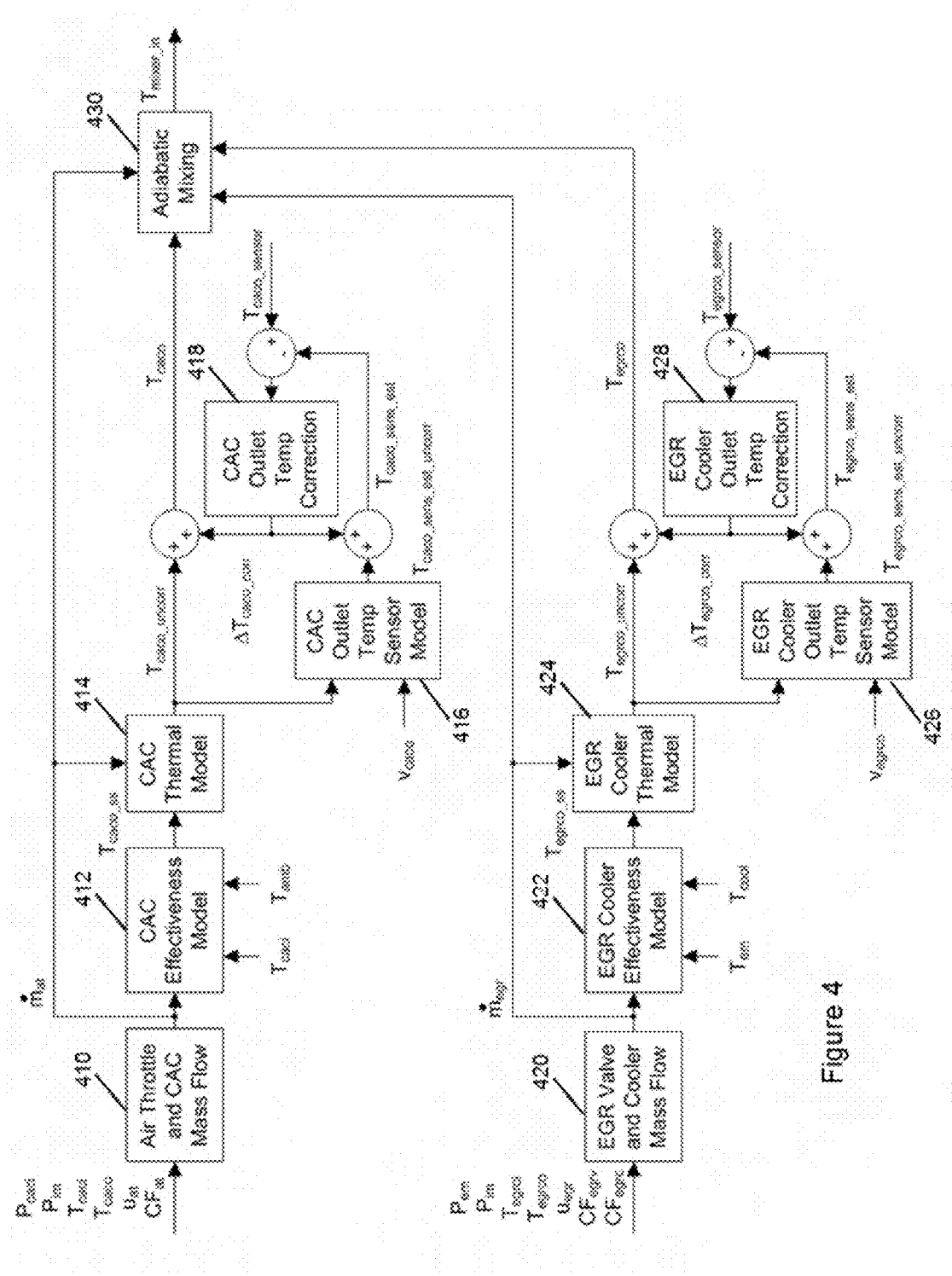
FIG. 4 illustrates an exemplary method for estimating a charge air cooler outlet temperature estimate, an EGR cooler outlet temperature estimate, and a mixer inlet temperature estimate using the readings from the charge air cooler and EGR cooler outlet temperature sensors.
Figure 5:
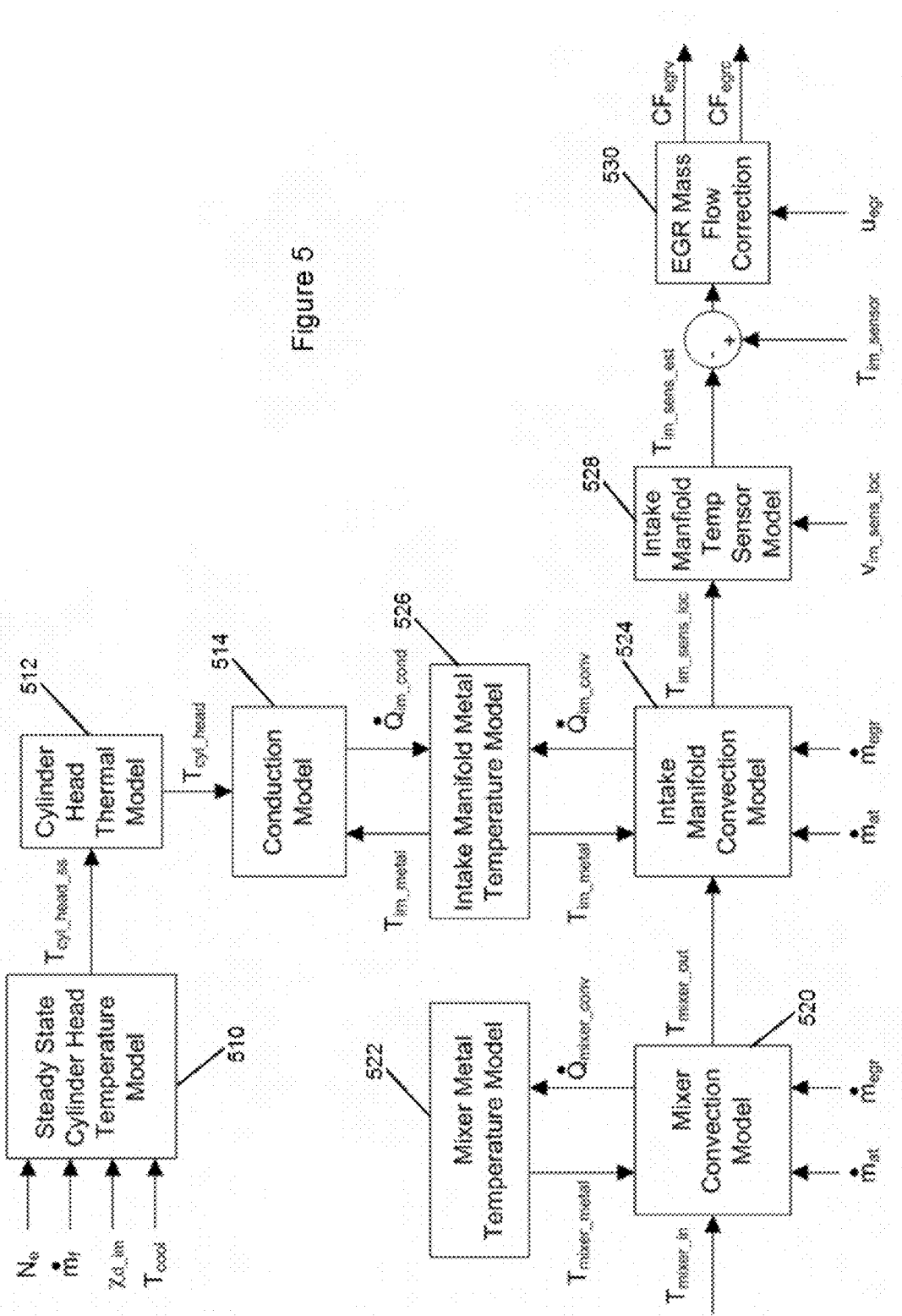
FIG. 5 illustrates an exemplary method for estimating system heat transfers, the intake manifold sensor location temperature estimate and the EGR mass flow corrections using the mixer inlet temperature estimate and the reading from the intake manifold temperature sensor.

Block diagrams for example calculations involving the three temperature sensors 308, 310, 314 are shown in FIGS. 4 and 5. FIG. 4 shows exemplary procedures for calculating the outlet temperature estimate $T_{caco}$ for the charge air cooler 206, the outlet temperature estimate $T_{egrco}$ for the EGR cooler 212, and the inlet temperature estimate $T_{mixer\_in}$ for the mixer 210. Included in these calculations are corrections based on the measured charge air cooler outlet temperature $T_{caco\_sensor}$ and the measured EGR cooler outlet temperature $T_{egrco\_sensor}$ from the temperature sensors 308, 314, respectively.

FIG. 5 shows exemplary procedures for calculating the heat transfers, the temperature estimate for the intake manifold 216 at the sensor location $T_{im\_sens\_loc}$, and the EGR valve flow correction factor $CF_{egrv}$ and the EGR cooler flow correction factor $CF_{egrc}$. The measured intake manifold temperature $T_{im\_sensor}$ from the temperature sensor 310 is used in calculating the EGR valve flow correction factor $CF_{egrv}$ and the EGR cooler flow correction factor $CF_{egrc}$.

The details of these example calculations will now be described starting with FIG. 4. Inputs to the calculations include the fresh air flow correction factor $CF_{air}$ which can be calculated as shown above in equation (26), the EGR valve flow correction factor $CF_{egrv}$ which can be calculated as shown below in equation (91), and the EGR cooler flow correction factor $CF_{egrc}$ which can be calculated as shown below in equation (92). Since the correction factors are calculated after updating all of the estimated parameters, the corrections factors used here are from the previous time step within the ECU.

At block 410, a mass flow through the air throttle 208 and CAC 206 is estimated. The inputs to block 410 include the fresh air flow correction factor $CF_{air}$, the position of the air throttle 208, the estimated inlet and outlet temperatures of the CAC 206, and the pressures at the inlet of the CAC 206 and at the intake manifold 216. Using these parameters, an air throttle 208 mass flow estimate $\dot{m}_{at}$ can be calculated as shown above in equation (12A).

At block 412, a CAC Effectiveness Model is used that has inputs which include the air throttle mass flow estimate $\dot{m}_{at}$ from block 410, the CAC 206 inlet temperature estimate $T_{caci}$ and the ambient air temperature $T_{amb}$. The CAC Effectiveness Model can be based on the following equation for charge air cooler effectiveness $\epsilon_{cac}$.

$$\varepsilon_{cac} = \frac{T_{caci} - T_{caco\_ss}}{T_{caci} - T_{amb}} \quad (31)$$

The charge air cooler effectiveness $\epsilon_{cac}$ is equal to the difference between the charge air cooler inlet temperature estimate $T_{caci}$ and the steady state charge air cooler outlet temperature estimate $T_{caco\_ss}$, divided by the difference between the charge air cooler inlet temperate estimate $T_{caci}$ and the ambient air temperature $T_{amb}$. The CAC Effectiveness Model can include a table defining the charge air cooler effectiveness $\epsilon_{cac}$ using the air throttle mass flow estimate $\dot{m}_{at}$ as the input and effectiveness as the output. To calculate the steady state charge air cooler outlet temperature estimate $T_{caco\_ss}$, equation (31) can be re-arranged as:

$$T_{caco\_ss} = T_{caci} + (T_{amb} - T_{caci}) \cdot \epsilon_{cac} \quad (32)$$

The charge air cooler 206 has thermal capacitance so it takes time for the outlet temperature to change following a change in operating conditions. The thermal response can be modeled using a first order filter. At block 414, a CAC Thermal Model can be used that has inputs which include the air throttle mass flow estimate $\dot{m}_{at}$ from block 410, and the steady state CAC outlet temperature estimate $T_{caco\_ss}$ from block 412. The CAC Thermal Model can calculate an uncorrected charge air cooler outlet temperature $T_{caco\_uncorr}$. The CAC Thermal Model can use the following filter equation:

$$\frac{dT_{caco\_uncorr}}{dt} = \frac{(T_{caco\_ss} - T_{caco\_uncorr})}{\tau_{cac}} \quad (33)$$

The charge air cooler time constant $\tau_{cac}$ can be calibrated using a table with the air throttle mass flow estimate $\dot{m}_{at}$ as the input, and the time constant as the output. The uncorrected charge air cooler outlet temperature $T_{caco\_uncorr}$ can be calculated by numerically integrating equation (33). Within the ECU, the modeled temperature can be given an initial condition and the temperature value at each time step of the controller can be updated by adding the rate of temperature change times the ECU calculation time step $\Delta t$ to the temperature at the previous time step.

$$T_{caco\_uncorr} = \frac{dT_{caco\_uncorr}}{dt} \cdot \Delta t + T_{caco\_uncorr\_previous} \quad (34)$$

At block 416, a CAC Outlet Temp Sensor Model can be designed to model the response time of the CAC outlet temperature sensor 308. The CAC Outlet Temp Sensor Model has inputs which include the air throttle mass flow estimate $\dot{m}_{at}$ from block 410, the uncorrected CAC outlet temperature $T_{caco\_uncorr}$ from block 414, and the CAC outlet velocity estimate $v_{caco}$. The uncorrected charge air cooler outlet temperature $T_{caco\_sens\_est\_uncorr}$ can be modeled using the following filter equations:

$$\frac{dT_{caco\_sens\_est\_uncorr}}{dt} = \frac{(T_{caco\_uncorr} - T_{caco\_sens\_est\_uncorr})}{\tau_{caco\_sensor}} \quad (35)$$

The charge air cooler outlet temperature sensor 308 time constant $\tau_{caco\_sensor}$ can be calibrated using a table with a charge air cooler outlet velocity estimate $v_{caco}$ as the input, and the time constant as the output. The charge air cooler 206 outlet velocity estimate $v_{caco}$ can be calculated with the following equation:

$$v_{caco} = \frac{\dot{m}_{at} \cdot R_{caco} \cdot T_{caco\_uncorr}}{A_{caco} \cdot P_{caco}} \quad (36)$$

where $R_{caco}$ is the gas constant at the charge air cooler 206 outlet, $A_{caco}$ is the cross section area at the location of the outlet temperature sensor 308 of the charge air cooler 206, and $P_{caco}$ is the charge air cooler 206 outlet pressure estimate. The uncorrected charge air cooler 206 outlet temperature $T_{caco\_sens\_est\_uncorr}$ can be calculated by numerically integrating equation (35). Within the ECU, the modeled temperature can be given an initial condition and the temperature value at each time step of the controller can be updated by adding the rate of temperature change times the ECU calculation time step $\Delta t$ to the temperature at the previous time step.

$$T_{caco\_sens\_est\_uncorr} = \frac{dT_{caco\_sens\_est\_uncorr}}{dt} \cdot \Delta t + T_{caco\_sens\_est\_uncorr\_previous} \quad (37)$$

The charge air cooler 206 outlet temperature sensor estimate $T_{caco\_sens\_est}$ is equal to the uncorrected charge air cooler outlet temperature estimate $T_{caco\_sens\_est\_uncorr}$ from block 416 plus the charge air cooler outlet temperature correction $\Delta T_{caco\_corr}$ (calculated below at block 418 using equation (40)).

$$T_{caco\_sens\_est} = T_{caco\_sens\_est\_uncorr} + \Delta T_{caco\_corr} \quad (38)$$

The charge air cooler outlet temperature error $T_{caco\_obs\_error}$ is equal to the measured charge cooler 206 outlet temperature $T_{caco\_sensor}$ from the temperature sensor 308 minus the charge air cooler 206 outlet temperature sensor estimate $T_{caco\_sens\_est}$.

$$T_{caco\_obs\_error} = T_{caco\_sensor} - T_{caco\_sens\_est} \quad (39)$$

At block 418, the charge air cooler 206 outlet temperature correction $\Delta T_{caco\_corr}$ is calculated with inputs that include the charge air cooler outlet temperature error $T_{caco\_obs\_error}$. The CAC 206 outlet temperature correction $\Delta T_{caco\_corr}$ can be calculated as the CAC outlet temperature integral gain $K_{i\_caco\_temp\_obs}$ times the charge air cooler outlet temperature error $T_{caco\_obs\_error}$ plus the previous charge air cooler outlet temperature correction $\Delta T_{caco\_corr\_previous}$.

$$\Delta T_{caco\_corr} = K_{i\_caco\_temp\_obs} \cdot T_{caco\_obs\_error} + \Delta T_{caco\_corr\_previous} \quad (40)$$

The charge air cooler 206 outlet temperature estimate $T_{caco}$ can then be calculated as the uncorrected charge air cooler outlet temperature estimate $T_{caco\_uncorr}$ from block 414 plus the charge air cooler outlet temperature correction $\Delta T_{caco\_corr}$ from block 418.

$$T_{caco} = T_{caco\_uncorr} + \Delta T_{caco\_corr} \quad (41)$$

The charge air cooler 206 outlet temperature estimate $T_{caco}$ calculated using the measured charge air cooler 206 outlet temperature from the temperature sensor 308 is input to an adiabatic mixing model at block 430.

At block 420, a mass flow through the EGR valve 214 and EGR cooler 212 is estimated. The inputs to block 420 include the EGR valve flow correction factor $CF_{egrv}$, the EGR cooler flow correction factor $CF_{egrc}$, the position of the EGR valve 214, the estimated inlet and outlet temperatures of the EGR cooler 212, and the pressures of the intake manifold 216 and the exhaust manifold 218. Using these parameters, an EGR valve mass flow estimate $\dot{m}_{egr}$ can be calculated as shown above in equation (13A).

At block 422, an EGR Cooler Effectiveness Model is used that has inputs which include the EGR valve mass flow estimate $\dot{m}_{egr}$ from block 420, the exhaust manifold temperature estimate $T_{em}$ and the coolant temperature $T_{cool}$. The EGR Cooler Effectiveness Model can be based on the following equations for EGR cooler effectiveness $\epsilon_{egrc}$.

$$\varepsilon_{egrc} = \frac{T_{em} - T_{egrco\_ss}}{T_{em} - T_{cool}} \quad (42)$$

The EGR cooler effectiveness $\epsilon_{egr}$ is equal to the difference between the exhaust manifold temperature estimate $T_{em}$ and the steady state EGR cooler outlet temperature estimate $T_{egrco\_ss}$, divided by the difference between the exhaust manifold temperate estimate $T_{em}$ and the coolant temperature $T_{cool}$. The EGR Cooler Effectiveness Model can include a table defining the EGR cooler effectiveness $\epsilon_{egr}$ using the EGR valve mass flow estimate $\dot{m}_{egr}$ as the input and effectiveness as the output. To calculate the steady state EGR cooler outlet temperature estimate $T_{egrco\_ss}$ equation (42) can be re-arranged as:

$$T_{egrco\_ss} = T_{em} + (T_{cool} - T_{em}) \cdot \epsilon_{egrc} \quad (43)$$

The EGR cooler 212 has thermal capacitance so it takes time for the outlet temperature to change following a change in operating conditions. The thermal response can be modeled using a first order filter. At block 424, an EGR Cooler Thermal Model can be used that has inputs which include the EGR valve mass flow estimate $\dot{m}_{egr}$ from block 420, and the steady state EGR cooler outlet temperature estimate $T_{egrco\_ss}$ from block 422. The EGR cooler Thermal Model can calculate an uncorrected EGR cooler outlet temperature $T_{egrco\_uncorr}$. The EGR Cooler Thermal Model can use the following filter equation:

$$\frac{dT_{egrco\_uncorr}}{dt} = \frac{(T_{egrco\_ss} - T_{egrco\_uncorr})}{\tau_{egrc}} \quad (44)$$

The EGR cooler time constant $\tau_{egrc}$ can be calibrated using a table with the EGR valve mass flow estimate $\dot{m}_{egr}$ as the input, and the time constant as the output. The uncorrected EGR cooler outlet temperature $T_{egrco\_uncorr}$ can be calculated by numerically integrating equation (44). Within the ECU, the modeled temperature can be given an initial condition and the temperature value at each time step of the controller can be updated by adding the rate of temperature change times the ECU calculation time step $\Delta t$ to the temperature at the previous time step.

$$T_{egrco\_uncorr} = \frac{dT_{egrco\_uncorr}}{dt} \cdot \Delta t + T_{egrco\_uncorr\_previous} \quad (45)$$

At block 426, an EGR Cooler Outlet Temp Sensor Model can be designed to model the response time of the EGR outlet temperature sensor 314. The EGR Cooler Outlet Temp Sensor Model has inputs which include the EGR valve mass flow estimate $\dot{m}_{egr}$ from block 420, the uncorrected EGR cooler outlet temperature $T_{egrco\_uncorr}$ from block 424, and the EGR cooler outlet velocity estimate $v_{egrco}$. The uncorrected EGR cooler outlet temperature $T_{egrco\_sens\_est\_uncorr}$ can be modeled using the following filter equations.

$$\frac{dT_{egrco\_sens\_est\_uncorr}}{dt} = \frac{(T_{egrco\_uncorr} - T_{egrco\_sens\_est\_uncorr})}{\tau_{egrco\_sensor}} \quad (46)$$

The EGR cooler outlet temperature sensor 314 time constant $\tau_{egrco\_sensor}$ can be calibrated using a table with an EGR cooler outlet velocity estimate $V_{egrco}$ as the input, and the time constant as the output. The EGR cooler 212 outlet velocity estimate $V_{egrco}$ can be calculated with the following equation.

$$v_{egrco} = \frac{\dot{m}_{egr} \cdot R_{egrco} \cdot T_{egrco\_uncorr}}{A_{egrco} \cdot P_{egrco}} \quad (47)$$

where $R_{egrco}$ is the gas constant at the EGR cooler 212 outlet, $A_{egrco}$ is the cross section area at the location of the outlet temperature sensor 314 of the EGR cooler 212, and $P_{egrco}$ is P the EGR cooler 212 outlet pressure estimate. The uncorrected EGR cooler 212 outlet temperature $T_{egrco\_sens\_est\_uncorr}$ can be calculated by numerically integrating equation (46). Within the ECU, the modeled temperature can be given an initial condition and the temperature value at each time step of the controller can be updated by adding the rate of temperature change times the ECU calculation time step $\Delta t$ to the temperature at the previous time step.

$$T_{egrco\_sens\_est\_uncorr} = \quad (48)$$

$$\frac{dT_{egrco\_sens\_est\_uncorr}}{dt} \cdot \Delta t + T_{egrco\_sens\_est\_uncorr\_previous}$$

The EGR cooler 212 outlet temperature sensor estimate $T_{egrco\_sens\_est}$ is equal to the uncorrected EGR cooler outlet temperature estimate $T_{egrco\_sens\_est\_uncorr}$ from block 426 plus the EGR cooler outlet temperature correction $\Delta T_{egrco\_corr}$ (calculated below at block 428 using equation (51)).

$$T_{egrco\_sens\_est} = T_{egrco\_sens\_est\_uncorr} + \Delta T_{egrco\_corr} \quad (49)$$

The EGR cooler outlet temperature error $T_{egrco\_obs\_error}$ is equal to the measured EGR cooler 212 outlet temperature $T_{egrco\_sensor}$ from the temperature sensor 314 minus the EGR cooler 212 outlet temperature sensor estimate $T_{egrco\_sens\_est}$.

$$T_{egrco\_obs\_error} = T_{egrco\_sensor} - T_{egrco\_sens\_est} \quad (50)$$

At block 428, the EGR cooler 212 outlet temperature correction $\Delta T_{egrco\_corr}$ is calculated with inputs that include the EGR cooler outlet temperature error $T_{egrco\_obs\_error}$. The EGR cooler 212 outlet temperature correction $\Delta T_{egrco\_corr}$ can be calculated as the EGR cooler outlet temperature integral gain $K_{i\_egrco\_temp\_obs}$ times the EGR cooler outlet temperature error $T_{egrco\_obs\_error}$ plus the previous EGR cooler outlet temperature correction $\Delta T_{egrco\_corr\_previous}$.

$$\Delta T_{egrco\_corr} = K_{i\_egrco\_temp\_obs} \cdot T_{egrco\_obs\_error} + \Delta T_{egrco\_corr\_previous} \quad (51)$$

The EGR cooler 212 outlet temperature estimate $T_{egrco}$ can then be calculated as the uncorrected EGR cooler outlet temperature estimate $T_{egrco\_uncorr}$ from block 424 plus the EGR cooler outlet temperature correction $\Delta T_{egrco\_corr}$ from block 428.

$$T_{egrco} = T_{egrco\_uncorr} + \Delta T_{egrco\_corr} \quad (52)$$

The EGR cooler 212 outlet temperature estimate $T_{egrco}$ calculated using the measured EGR cooler 212 outlet temperature from the temperature sensor 314 is input to the adiabatic mixing model at block 430.

At block 430, with inputs that include the air throttle and EGR valve mass flow estimates from blocks 410 and 420 and the charge air and EGR cooler outlet temperature estimates, the inlet temperature of the mixer 210 can be calculated by assuming adiabatic mixing, which means the enthalpy of the air throttle mass flow plus the enthalpy of the EGR valve mass flow equals the enthalpy of the mixed flow. This relationship can be expressed using mass flows, specific heats, and temperatures as follows.

$$\dot{m}_{at} \cdot C_{p\_at} \cdot T_{caco} + \dot{m}_{egr} \cdot C_{p\_egr} \cdot T_{egrco} = (\dot{m}_{at} \cdot C_{p\_at} + \dot{m}_{egr} \cdot C_{p\_egr}) \cdot T_{mixer\_in} \quad (53)$$

Equation (53) can be re-arranged to solve for the mixer 210 inlet temperature estimate $T_{mixer\_in}$.

$$T_{mixer\_in} = \frac{\dot{m}_{at} \cdot C_{p\_at} \cdot T_{caco} + \dot{m}_{egr} \cdot C_{p\_egr} \cdot T_{egrco}}{\dot{m}_{at} \cdot C_{p\_at} + \dot{m}_{egr} \cdot C_{p\_egr}} \quad (54)$$

Figure 6:
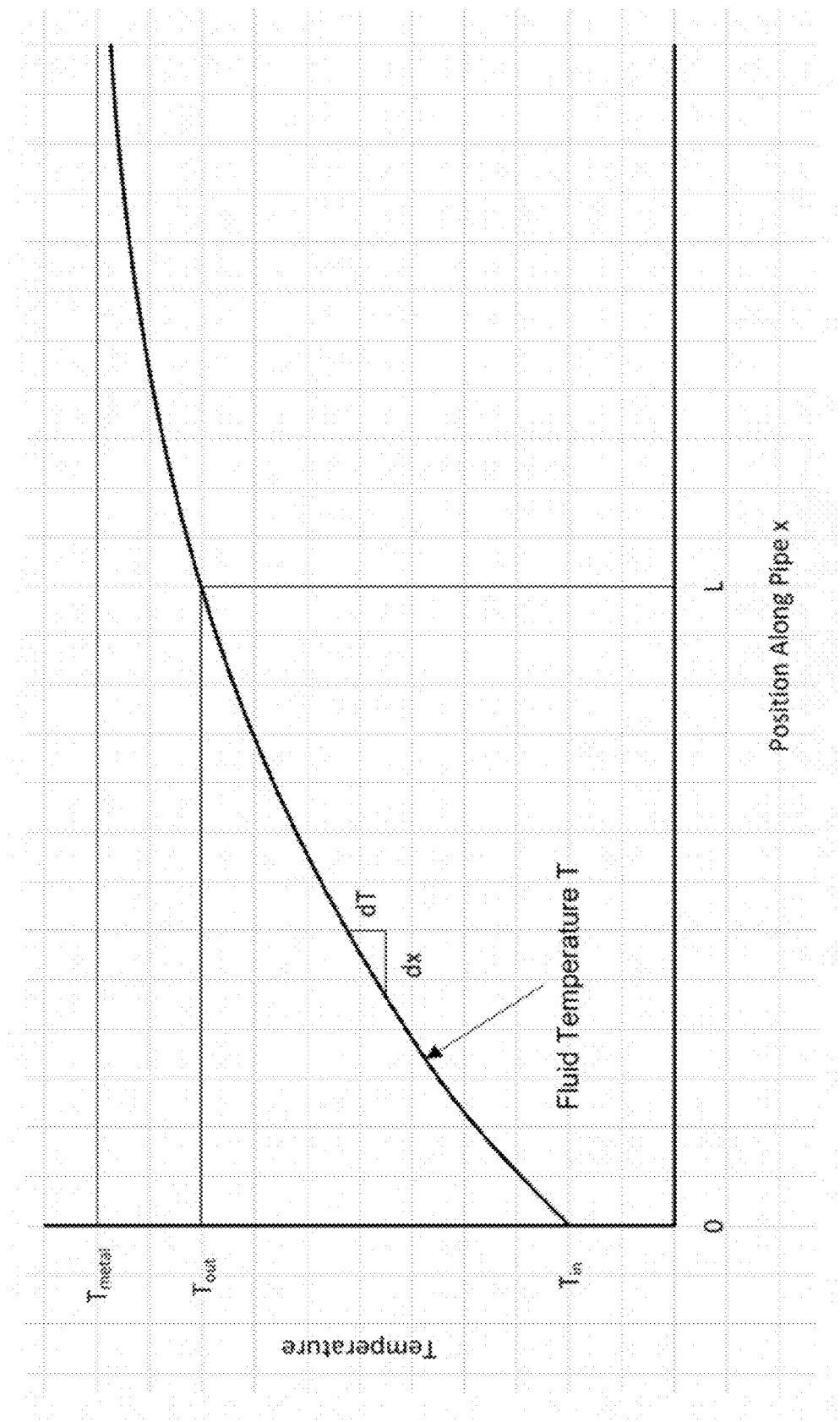
FIG. 6 illustrates heat transfer between a fluid and a metal pipe as the fluid flows along the length of the pipe.

A convection heat transfer model can be used to evaluate the temperature change of the flow as it passes through the mixer 210 and the intake manifold 216. The mixer 210 and the intake manifold 216 can each be modeled as a section of pipe with a constant wall temperature. FIG. 6 shows heat transfer between a fluid and a metal pipe as the fluid flows along the length of the pipe. For a long length of pipe, the temperature of the fluid in the pipe will converge to the wall temperature $T_{metal}$ as the fluid flow passes through the pipe. The equation for this temperature change can be determined by evaluating the heat transfer between the pipe wall and the fluid. For a small length of pipe dx, the convection heat transfer rate $d\dot{Q}$ for that section of pipe can be calculated as follows.

$$d\dot{Q} = h \cdot \pi \cdot D \cdot dx \cdot (T_{metal} - T) \quad (55)$$

where $T_{metal}$ is the temperature of the pipe, T is the temperature of the fluid flowing through the pipe, h is the convection heat transfer coefficient, and D is the pipe diameter. The quantity $\pi \cdot D \cdot dx$ is the heat transfer area.

The heat transfer rate $d\dot{Q}$ will cause a change in fluid temperature dT as the fluid flows across section dx of the pipe. The heat transfer rate is equal to the mass flow rate $\dot{m}$, times the specific heat of the fluid $C_p$, times the temperature change dT.

$$d\dot{Q} = \dot{m} \cdot C_p \cdot dT \quad (56)$$

The heat transfer rate from equation (55) is equal to the heat transfer rate from equation (56). Combining these two equations provides the following relationship.

$$\dot{m} \cdot C_p \cdot dT = h \cdot \pi \cdot D \cdot dx \cdot (T_{metal} - T) \quad (57)$$

Equation (57) can be re-arranged to the form of a first order differential equation.

$$\frac{\dot{m} \cdot C_p}{h \cdot \pi \cdot D} \cdot \frac{dT}{dx} + T = T_{metal} \quad (58)$$

The solution to this differential equation will have the following form $$T = A \cdot \exp(-B \cdot x) + C \quad (59)$$

where A, B, and C are constants. The derivative of the solution in equation (59) will have the following form.

$$\frac{dT}{dx} = -A \cdot B \cdot \exp(-B \cdot x) \quad (60)$$

The constant C in equation (59) can be solved for by considering the boundary condition at x equals infinity, where the temperature of the fluid T equals the temperature of the pipe $T_{metal}$. At this boundary condition:

$$T_{metal} = A \cdot 0 + C \quad (61)$$

$$C = T_{metal} \quad (62)$$

The constant A in equation (59) can be solved for by considering the boundary condition at x equals 0, where the temperature of the fluid T equals the temperature of the fluid at the pipe inlet $T_{in}$. At this boundary condition, knowing that $C = T_{metal}$:

$$T_{in} = A + T_{metal} \quad (63)$$

$$A = T_{in} - T_{metal} \quad (64)$$

The constant B can be solved for by substituting equations (59) and (60) into equation (58).

$$\frac{\dot{m} \cdot C_p}{h \cdot \pi \cdot D} \cdot (-A \cdot B \cdot \exp(-B \cdot x)) + (A \cdot \exp(-B \cdot x) + C) = T_{metal} \quad (65)$$

Equation (65) can be rearranged to the following form.

$$\left(1 - \frac{\dot{m} \cdot C_p \cdot B}{h \cdot \pi \cdot D}\right) \cdot A \cdot \exp(-B \cdot x) + C = T_{metal} \quad (66)$$

The values of A and C from equations (62) and (64) can be substituted into equation (66).

$$\left(1 - \frac{\dot{m} \cdot C_p \cdot B}{h \cdot \pi \cdot D}\right) \cdot (T_{in} - T_{metal}) \cdot \exp(-B \cdot x) = 0 \quad (67)$$

For equation (67) to be valid for all values of x, the first part must be equal to zero.

$$\left(1 - \frac{\dot{m} \cdot C_p \cdot B}{h \cdot \pi \cdot D}\right) = 0 \quad (68)$$

It is now possible to solve for the constant B by rearranging equation (68).

$$B = \frac{h \cdot \pi \cdot D}{\dot{m} \cdot C_p} \quad (69)$$

Substituting the values for A, B and C into equation (59) provides an equation for the temperature as a function of position along the pipe.

$$T = T_{metal} + (T_{in} - T_{metal}) \cdot \exp\left(\frac{-h \cdot \pi \cdot D \cdot x}{\dot{m} \cdot C_p}\right) \quad (70)$$

To solve for the fluid temperature $T_{out}$ at the outlet of the pipe at position L, we can substitute L for x, or replace the $\pi \cdot D \cdot x$ term with the inner surface area of the pipe A.

$$T_{out} = T_{metal} + (T_{in} - T_{metal}) \cdot \exp\left(\frac{-h \cdot A}{\dot{m} \cdot C_p}\right) \quad (71)$$

The temperature change in the mixer 210 and the intake manifold 216 can be modeled using equations of the form given by equation (71).

$$T_{mixer\_out} = \quad (72)$$
$$T_{mixer\_metal} + (T_{mixer\_in} - T_{mixer\_metal}) \cdot \exp\left(\frac{-h_{mixer} \cdot A_{mixer}}{\dot{m}_{at} \cdot C_{p\_at} + \dot{m}_{egr} \cdot C_{p\_egr}}\right)$$

$$T_{im\_sens\_loc} = \quad (73)$$
$$T_{im\_metal} + (T_{mixer\_out} - T_{im\_metal}) \cdot \exp\left(\frac{-h_{im} \cdot A_{im}}{\dot{m}_{at} \cdot C_{p\_at} + \dot{m}_{egr} \cdot C_{p\_egr}}\right)$$

Figure 7:
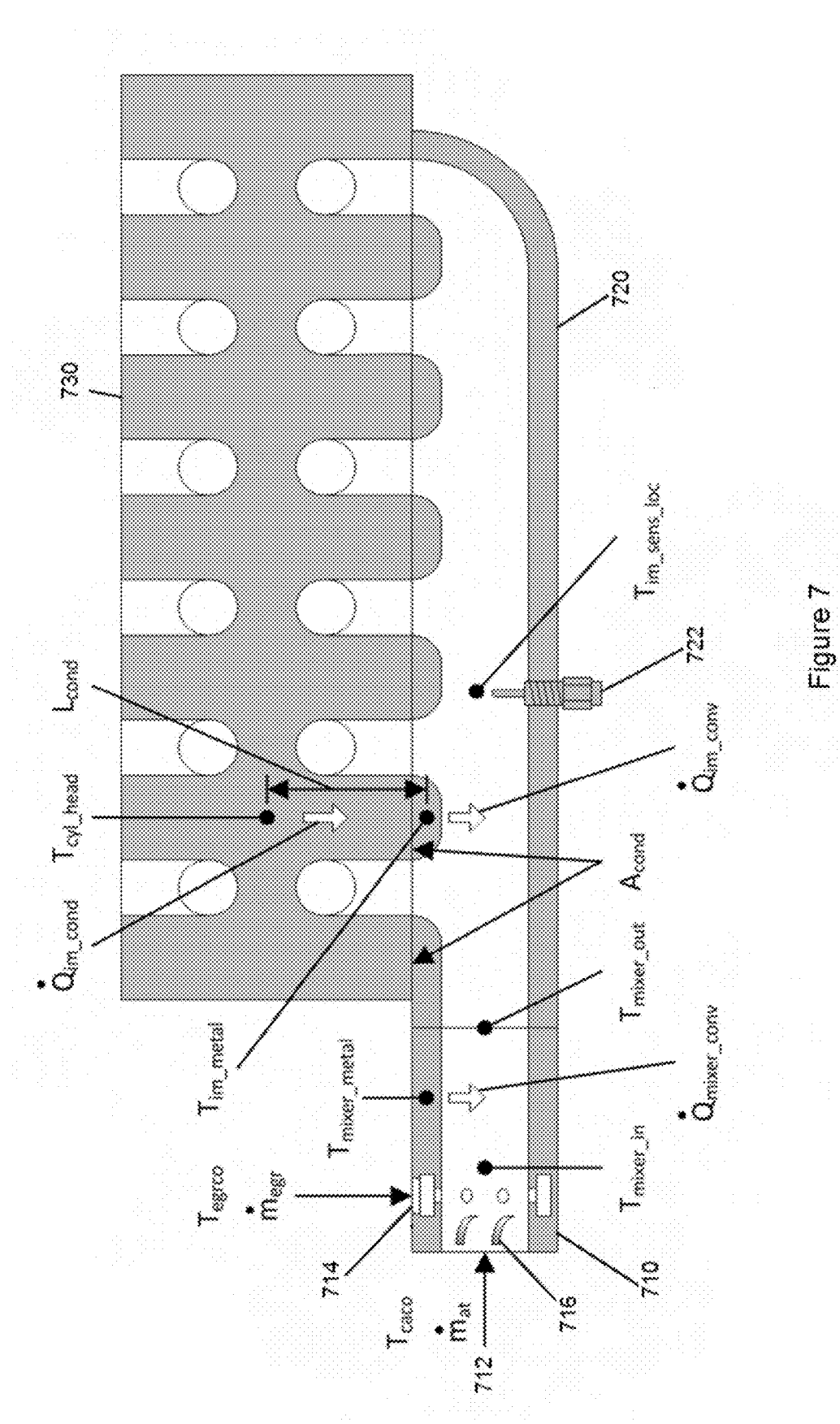
FIG. 7 illustrates an exemplary embodiment of a mixer, an intake manifold, a cylinder head and an intake manifold temperature sensor also illustrating various exemplary locations of various system parameters.

FIG. 7 illustrates an exemplary embodiment of a mixer 710, an intake manifold 720, a cylinder head 730 and an intake manifold temperature sensor 722. The mixer 710 includes an air inlet 712 that receives air from an air throttle and an EGR inlet 714 that receives EGR from an EGR valve. The mixer 710 also includes mixing vanes 716. The mixture passes from the mixer 710 into the intake manifold 720 which is attached to the cylinder head 730. FIG. 7 also shows exemplary locations for temperatures at the mixer inlet $T_{mixer\_in}$, the mixer outlet $T_{mixer\_out}$, the intake manifold temperature sensor location $T_{im\_sens\_loc}$, the mixer metal $T_{mixer\_metal}$, the intake manifold metal $T_{im\_metal}$, and the cylinder head $T_{cyl\_head}$. The convective heat transfer coefficients for the mixer 710 and the intake manifold 720 are represented by $h_{mixer}$ and $h_{im}$. The internal surface area of the mixer 710 and the intake manifold 720 are represented by $A_{mixer}$ and $A_{im}$. Here the flow through the mixer 710 and the intake manifold 720 are assumed to be equal to the sum of the air throttle mass flow $\dot{m}_{at}$ and the EGR mass flow $\dot{m}_{egr}$. If separate specific heat values are available for the air throttle flow $C_{p\_at}$ and the EGR flow $C_{p\_egr}$ they can be used in equations (72) and (73) as shown. Otherwise, a single specific heat value representing the combined mixture can be used.

A heat transfer model can be used to calculate the metal temperatures and heat transfer rates shown in FIG. 7. The temperature of the cylinder head 730 can affect the temperature of the metal of the intake manifold 720 as well as the temperature in the intake manifold 720. Combustion in the cylinders and coolant flow significantly affect the temperature of the cylinder head 730. Heat is transferred from the cylinder head 730 to the intake manifold 720 by conduction and by convection to the intake manifold flow.

The temperature of the cylinder head 730 can be estimated using a regression model to determine a steady state cylinder head temperature estimate $T_{cyl\_head\_ss}$ and then applying a filter to provide the appropriate response for the thermal capacitance of the cylinder head 730. This is shown as a Steady State Cylinder Head Temperature Model 510 in FIG. 5. Inputs to block 510 include the engine speed $N_e$, the fuel mass flow $\dot{m}_f$, the intake manifold diluent mass fraction) $\chi_{d\_im}$, and the coolant temperature $T_{cool}$.

The steady state cylinder head temperature estimate $T_{cyl\_head\_ss}$ can be calculated as follows.

$$T_{cyl\_head\_ss} = T_{cool} + C_0(N_e) + C_1(N_e) \cdot \dot{m}_f + C_2(N_e) \cdot \chi_{d\_im} \quad (74)$$

The cylinder head temperature is assumed to be directly related to coolant temperature $T_{cool}$. The three coefficients $C_0$, $C_1$, and $C_2$, can each be defined using tables with engine speed $N_e$ as the input. This approach allows different coefficients to be used for different engine speeds. $C_0$ is an offset term. $C_1$ is the sensitivity to fuel mass flow $\dot{m}_f$, C2 is the sensitivity to intake manifold diluent mass fraction $\chi_{d\_im}$. Heat transfer to the intake manifold 720 can be assumed to have a negligible effect on the temperature of the cylinder head 730 because that heat transfer rate is typically small compared to the heat transfer rates with the cylinders and the coolant.

At block 512, a cylinder head thermal model is used to calculate the cylinder head $T_{cyl\_head}$ using the steady state cylinder head temperature estimate $T_{cyl\_head\_ss}$ calculated in block 510. The rate of change in the temperature of the cylinder head 730 can be estimated using a state equation in the form of a first order filter with time constant $\tau_{cyl\_head}$.

$$\frac{dT_{cyl\_head}}{dt} = \frac{(T_{cyl\_head\_ss} - T_{cyl\_head})}{\tau_{cyl\_head}} \quad (75)$$

Using this relationship, the cylinder head temperature can be calculated by numeric integration. Within the ECU, the cylinder head temperature can be given an initial condition and the temperature value at each time step of the controller can be updated by adding the rate of temperature change times the ECU calculation time step $\Delta t$ to the temperature at the previous time step.

$$T_{cyl\_head} = \frac{dT_{cyl\_head}}{dt} \cdot \Delta t + T_{cyl\_head\_previous} \quad (76)$$

The cylinder head temperature $T_{cyl\_head}$ is input to a conduction model between the cylinder head 730 and the intake manifold 720 at block 514. Inputs to the conduction model at block 514 include the cylinder head temperature $T_{cyl\_head}$ calculated in block 512 and the intake manifold metal temperature $T_{im\_metal}$ calculated in block 526 (described below). The conduction heat transfer rate from the cylinder head 730 to the intake manifold 720 can be estimated by the thermal conductivity of the cylinder head $k_{cond}$ times the conduction cross section area $A_{cond}$ divided by the conduction length $L_{cond}$ times the difference in metal temperature between the cylinder head $T_{cyl\_head}$ and the intake manifold $T_{im\_metal}$.

$$\dot{Q}_{im\_cond} = \left(\frac{k_{cond} \cdot A_{cond}}{L_{cond}}\right) \cdot (T_{cyl\_head} - T_{im\_metal}) \quad (77)$$

The conduction heat transfer rate from the cylinder head 730 to the intake manifold 720 is input to a metal temperature model for the intake manifold 720 at block 526.

At block 520 a mixer convection model is used to estimate the temperature change of the mixture as it passes through the mixer 710. The temperature $T_{mixer\_in}$ at the inlet of mixer 710 can be estimated using equation (54) as input from block 430 of FIG. 4. Inputs to block 520 also include the air throttle mass flow estimate $\dot{m}_{at}$ from block 410 (which can be calculated as shown in equation (12A)), the EGR valve mass flow estimate $\dot{m}_{egr}$ from block 420 (which can be calculated as shown in equation (13A)) and the mixer metal temperature $T_{mixer\_metal}$ from block 522 (described below). The convection heat transfer rate is equal to the mass flow rate times the specific heat of the mixture times the temperature change of the mass flow.

$$\dot{Q}_{mixer\_conv} = (\dot{m}_{at} \cdot C_{p\_at} + \dot{m}_{egr} \cdot C_{p\_egr}) \cdot (T_{mixer\_out} - T_{mixer\_in}) \quad (78)$$

At block 522 a mixer metal temperature model estimates the rate of change in metal temperature for the mixer 710 using the convection heat transfer rate for the mixer calculated in block 520. The rate of change in metal temperature is equal to the rate of heat transfer to the metal divided by the mass and specific heat.

$$\frac{dT_{mixer\_metal}}{dt} = \frac{-\dot{Q}_{mixer\_conv}}{m_{mixer\_metal} \cdot C_{p\_mixer\_metal}} \quad (79)$$

The metal temperature of the mixer 710 can be estimated by numerically integrating equation (79). Within the ECU, the metal temperature can be given an initial condition and the temperature value at each time step of the controller can be updated by adding the rate of temperature change times the ECU calculation time step $\Delta t$ to the temperature at the previous time step.

$$T_{mixer\_metal} = \frac{dT_{mixer\_metal}}{dt} \cdot \Delta t + T_{mixer\_metal\_previous} \quad (80)$$

The mixer metal temperature $T_{mixer\_metal}$ can then be supplied to block 520 and used to estimate the mixer outlet temperature $T_{mixer\_out}$ using equation (72).

At block 524 an intake manifold convection model is used to estimate the temperature change of the mixture as it passes through the intake manifold 720 from the outlet of the mixer 710 to the location of the intake manifold temperature sensor 722. Inputs to block 524 include the mixer outlet temperature $T_{mixer\_out}$ from block 520, the intake manifold metal temperature $T_{im\_metal}$ from block 526, and the air throttle and EGR valve mass flow estimates $\dot{m}_{at}$, $\dot{m}_{egr}$ from blocks 410 and 420 The convection heat transfer rate is equal to the mass flow rate times the specific heat of the mixture times the temperature change of the mass flow.

$$\dot{Q}_{im\_conv} = (\dot{m}_{at} \cdot C_{p\_at} + \dot{m}_{egr} \cdot C_{p\_egr}) \cdot (T_{im\_sens\_loc} - T_{mixer\_out}) \quad (81)$$

At block 526 the intake manifold metal temperature model is used to estimate the rate of change in metal temperature for the intake manifold 720 using the intake manifold convection heat transfer rate calculated in block 524. The rate of change in metal temperature is equal to the rate of heat transfer to the metal divided by the mass and specific heat.

$$\frac{dT_{im\_metal}}{dt} = \frac{\dot{Q}_{im\_cond} - \dot{Q}_{im\_conv}}{m_{im\_metal} \cdot C_{p\_im\_metal}} \quad (82)$$

The metal temperature of the intake manifold 720 can be calculated by numerically integrating equation (82). Within the ECU, the metal temperature can be given an initial condition and the temperature value at each time step of the controller can be updated by adding the rate of temperature change times the ECU calculation time step $\Delta t$ to the temperature at the previous time step.

$$T_{im\_metal} = \frac{dT_{im\_metal}}{dt} \cdot \Delta t + T_{im\_metal\_previous} \quad (83)$$

The intake manifold metal temperature $T_{im\_metal}$ can then be supplied to block 524 and used to estimate the temperature at the intake manifold sensor location $T_{im\_sens\_loc}$ using equation (73).

The simple pipe model used in the above example to represent the mixer 710 and the intake manifold 720 can improve the intake manifold temperature estimate by capturing some of the heat transfer characteristics. There are differences between the pipe model and the actual mixer and intake manifold: for example, the shape of the mixer and intake manifold are different than a straight pipe, the metal temperature may be non-uniform, and the flow may be non-uniform. A more detailed heat transfer model could be used but as the model complexity increases it becomes more difficult to calibrate and the calculations consume more of the control processor capacity.

At block 528, an Intake Manifold Temp Sensor Model can be designed to predict the response of the intake manifold temperature sensor 722 using the temperature estimate at the intake manifold sensor location $T_{im\_sens\_loc}$ from block 524. The intake manifold temperature sensor estimate $T_{im\_sens\_est}$ can be modeled using the following filter equations.

$$\frac{dT_{im\_sens\_est}}{dt} = \frac{(T_{im\_sens\_loc} - T_{im\_sens\_est})}{\tau_{im\_sensor}} \quad (84)$$

The intake manifold temperature sensor time constant $\tau_{im\_sensor}$ can be calibrated using a table with the intake manifold velocity estimate $v_{im}$ as the input, and the time constant as the output. The intake manifold velocity estimate $v_{im\_sens\_loc}$ can be calculated with the following equation.

$$v_{im\_sens\_loc} = \frac{(\dot{m}_{at} + \dot{m}_{egr}) \cdot X_{im\_sens\_loc} \cdot R_{im} \cdot T_{im\_sens\_loc}}{A_{im\_sens\_loc} \cdot P_{im}} \quad (85)$$

where $R_{im}$ is the intake manifold gas constant, $A_{im\_sens\_loc}$ is the cross section area at the intake manifold temperature sensor location, $P_{im}$ is the intake manifold pressure estimate, and $X_{im\_sens\_loc}$ is the fraction of the total intake manifold flow that is passing through $A_{im\_sens\_loc}$. For the example intake manifold 720 shown in FIG. 7, the value of $X_{im\_sens\_loc}$ would be 4/6 because flow passing the sensor is supplying 4 of the 6 engine cylinders.

The intake manifold temperature sensor estimate $T_{im\_sens\_est}$ can be calculated by numerically integrating equation (84). Within the ECU, the modeled temperature can be given an initial condition and the temperature value at each time step of the controller can be updated by adding the rate of temperature change times the ECU calculation time step $\Delta t$ to the temperature at the previous time step.

$$T_{im\_sens\_est} = \frac{dT_{im\_sens\_est}}{dt} \cdot \Delta t + T_{im\_sens\_est\_previous} \quad (86)$$

The measured intake manifold temperature $T_{im\_sensor}$ from the intake manifold temperature sensor 722 can then be compared to the intake manifold temperature sensor estimate $T_{im\_sens\_est}$ calculated in block 528 and the difference provides an intake manifold temperature error $T_{im\_obs\_error}$:

$$T_{im\_obs\_error} = T_{im\_sensor} - T_{im\_sens\_est} \quad (87)$$

that is input to block 530.

At block 530, EGR mass flow correction factors are calculated using the EGR valve position $u_{egr}$ and the intake manifold temperature error $T_{im\_obs\_error}$ from block 528.

A proportional EGR flow correction factor $CF_{egr\_prop}$ is equal to the intake manifold temperature proportional gain $K_{p\_im\_temp\_obs}$ times the intake manifold temperature error $T_{im\_obs\_error}$.

$$CF_{egr\_prop} = K_{p\_im\_temp\_obs} \cdot T_{im\_obs\_error} \quad (88)$$

An integral EGR valve flow correction factor $CF_{egrv\_int}$ is equal to the intake manifold temperature integral gain $K_{i\_im\_temp\_obs}$ times the intake manifold temperature error $T_{im\_obs\_error}$ plus the previous integral EGR valve flow correction factor $CF_{egrv\_int\_previous}$.

$$CF_{egrv\_int} = K_{i\_im\_temp\_obs} \cdot T_{im\_obs\_error} + CF_{egrv\_int\_previous} \quad (89)$$

An integral EGR cooler flow correction factor $CF_{egrc\_int}$ is equal to the intake manifold temperature integral gain $K_{i\_im\_temp\_obs}$ times the intake manifold temperature error $T_{im\_obs\_error}$ plus the previous integral EGR cooler flow correction factor $CF_{egrc\_int\_previous}$.

$$CF_{egrc\_int} = K_{i\_im\_temp\_obs} \cdot T_{im\_obs\_error} + CF_{egrc\_int\_previous} \quad (90)$$

The integral EGR valve flow correction factor $CF_{egrv\_int}$ and integral EGR cooler flow correction factor $CF_{egrc\_int}$ are intended to provide slow corrections that adapt over a long period of time. For example, it the EGR cooler restriction changes over the life of the vehicle we would want to update the integral EGR cooler flow correction factor $CF_{egrc\_int}$ to compensate for this change. These correction factors do not have to be updated at every time step. It may be desirable to only update the integral EGR valve flow correction factor $CF_{egrv\_int}$ below a certain EGR valve position $u_{egr}$ when the EGR valve is the dominant flow limiting factor, and to update the integral EGR cooler flow correction factor $CF_{egrc\_int}$ above a certain EGR valve position $u_{egr}$ when the EGR cooler is the dominant flow limiting factor. It may also be desirable to limit updating of these flow corrections to certain operating conditions such as when the engine is fully warmed up.

The integral EGR valve flow correction factor $CF_{egrv\_int}$ and integral EGR cooler flow correction factor $CF_{egrc\_int}$ can each be assigned an initial value of one when the ECU is first programmed and the values can be stored in non-volatile memory so that the updated values are not reset when the engine is shut down.

An EGR valve flow correction factor $CF_{egrv}$ can be calculated as the sum of the proportional EGR flow correction factor $CF_{egr\_prop}$ and the integral EGR valve flow correction factor $CF_{egrv\_int}$.

$$CF_{egrv} = CF_{egr\_prop} + CF_{egrv\_int} \quad (91)$$

An EGR cooler flow correction factor $CF_{egrc}$ can be calculated as the sum of the proportional EGR flow correction factor $CF_{egr\_prop}$ and the integral EGR cooler flow correction factor $CF_{egrc\_int}$.

$$CF_{egrc} = CF_{egr\_prop} + CF_{egrc\_int} \quad (92)$$

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An exhaust gas recirculation (EGR) flow correction method for an engine air system comprising an air input, an EGR input and a mixer; the method comprising:
   measuring an air temperature of air passing through the air input using a first temperature sensor;
   measuring an EGR temperature of EGR gases passing through the EGR input using a second temperature sensor;
   measuring a mixed gas temperature of mixed gases after passing through the mixer using a third temperature sensor, the mixed gas being a mixture of the air passing through the air input and the EGR gases passing through the EGR input;
   modeling the engine air system using an engine air system model;
   computing an EGR flow correction using the air temperature, the exhaust gas temperature and the mixed gas temperature; and
   using the EGR flow correction in the engine air system model.

2. The EGR flow correction method of claim 1, wherein the engine air system further comprises an intake manifold, and the third temperature sensor is located in the intake manifold.

3. The EGR flow correction method of claim 2, wherein modeling the engine air system comprises:
   estimating a mass flow through the air input;
   estimating a mass flow through the EGR input;
   estimating an intake manifold temperature at the location of the third temperature sensor using the mass flows through the air input and the EGR input; and
   wherein computing an EGR flow correction comprises:
   computing an intake manifold temperature error based on the mixed gas temperature measured by the third temperature sensor minus the estimated intake manifold gas temperature at the location of the third temperature sensor; and computing the EGR flow correction based on the intake manifold temperature error.

4. The EGR flow correction method of claim 3; wherein estimating an intake manifold gas temperature at the location of the third temperature sensor comprises
- modeling a conduction heat transfer rate of the intake manifold;
- modeling a convection heat transfer rate of the intake manifold;
- using the conduction heat transfer rate and the convection heat transfer rate of the intake manifold to estimate the intake manifold temperature at the location of the third temperature sensor.

5. The EGR flow correction method of claim 1, wherein the air input comprises a charge air cooler (CAC) and an air throttle, and the EGR input comprises an EGR cooler and an EGR valve, the first temperature sensor being located between the CAC and the air throttle and the second temperature sensor being located between the EGR cooler and the EGR valve.

6. The EGR flow correction method of claim 5, wherein modeling the engine air system comprises:
- estimating a mass flow through the air throttle;
- estimating a CAC outlet temperature using the first temperature sensor measurement and the mass flow through the air throttle;
- estimating a mass flow through the EGR valve;
- estimating an EGR cooler outlet temperature using the second temperature sensor measurement and the mass flow through the EGR valve;
- estimating a mixer input temperature using the estimated CAC outlet temperature, the estimated EGR cooler outlet temperature and the mass flows through the air throttle and the EGR valve.

7. The EGR flow correction method of claim 6, wherein estimating a CAC outlet temperature comprises:
- estimating an uncorrected CAC outlet temperature using a CAC thermal model and the mass flow through the air throttle;
- computing a CAC outlet temperature correction using the uncorrected CAC outlet temperature and the first temperature sensor measurement; and
- computing the CAC outlet temperature using the uncorrected CAC outlet temperature and the CAC outlet temperature correction.

8. The EGR flow correction method of claim 7, wherein estimating a CAC outlet temperature further comprises:
- estimating a CAC outlet velocity using the mass flow through the air throttle and the uncorrected CAC outlet temperature;
- estimating a CAC outlet sensor time constant using the CAC outlet velocity;
- estimating an uncorrected CAC outlet sensor temperature using the CAC outlet sensor time constant; and
- computing the CAC outlet temperature correction using the uncorrected CAC outlet sensor temperature.

9. The EGR flow correction method of claim 6, wherein estimating an EGR cooler outlet temperature comprises:
- estimating an uncorrected EGR cooler outlet temperature using an EGR cooler thermal model and the mass flow through the EGR valve;
- computing an EGR cooler outlet temperature correction using the uncorrected EGR cooler outlet temperature and the second temperature sensor measurement; and
- computing the EGR cooler outlet temperature using the uncorrected EGR cooler outlet temperature and the EGR cooler outlet temperature correction.

10. The EGR flow correction method of claim 9, wherein estimating an EGR cooler outlet temperature further comprises:
- estimating an EGR cooler outlet velocity using the mass flow through the EGR valve and the uncorrected EGR cooler outlet temperature;
- estimating an EGR cooler outlet sensor time constant using the EGR cooler outlet velocity;
- estimating an uncorrected EGR cooler outlet sensor temperature using the EGR cooler outlet sensor time constant; and
- computing the EGR cooler outlet temperature correction using the uncorrected EGR cooler outlet sensor temperature.

11. The EGR flow correction method of claim 1, wherein the engine air system further comprises an intake manifold, the air input comprises a charge air cooler (CAC) and an air throttle, and the EGR input comprises an EGR cooler and an EGR valve; the first temperature sensor being located between the CAC and the air throttle, the second temperature sensor being located between the EGR cooler and the EGR valve and the third temperature sensor being located in the intake manifold.

12. The EGR flow correction method of claim 11, wherein modeling the engine air system comprises:
- estimating a mass flow through the air throttle;
- estimating a CAC outlet temperature using the first temperature sensor measurement and the mass flow through the air throttle;
- estimating a mass flow through the EGR valve;
- estimating an EGR cooler outlet temperature using the second temperature sensor measurement and the mass flow through the EGR valve;
- estimating a mixer input temperature using the estimated CAC outlet temperature, the estimated EGR cooler outlet temperature and the mass flows through the air throttle and the EGR valve;
- estimating an intake manifold temperature at the location of the third temperature sensor using the mass flows through the air throttle and the EGR valve; and wherein computing an EGR flow correction comprises:
- computing an intake manifold temperature error based on the mixed gas temperature measured by the third temperature sensor minus the estimated intake manifold gas temperature at the location of the third temperature sensor; and
- computing the EGR flow correction based on the intake manifold temperature error.

13. The EGR flow correction method of claim 12; wherein estimating an intake manifold gas temperature at the location of the third temperature sensor comprises:
- modeling a conduction heat transfer rate of the intake manifold;
- modeling a convection heat transfer rate of the intake manifold;
- using the conduction heat transfer rate and the convection heat transfer rate of the intake manifold to estimate the intake manifold temperature at the location of the third temperature sensor.

14. The EGR flow correction method of claim 13, wherein estimating a CAC outlet temperature comprises:
- estimating an uncorrected CAC outlet temperature using a CAC thermal model and the mass flow through the air throttle;

computing a CAC outlet temperature correction using the uncorrected CAC outlet temperature and the first temperature sensor measurement; and computing the CAC outlet temperature using the uncorrected CAC outlet temperature and the CAC outlet temperature correction; and wherein estimating an EGR cooler outlet temperature comprises:

estimating an uncorrected EGR cooler outlet temperature using an EGR cooler thermal model and the mass flow through the EGR valve;

computing an EGR cooler outlet temperature correction using the uncorrected EGR cooler outlet temperature and the second temperature sensor measurement; and computing the EGR cooler outlet temperature using the uncorrected EGR cooler outlet temperature and the EGR cooler outlet temperature correction.

15. The EGR flow correction method of claim 14, wherein modeling the engine air system comprises:

modeling a convection heat transfer rate of the mixer;

estimating a mixer output temperature using the mixer input temperature, the convection heat transfer rate of the mixer, and the mass flows through the air throttle and the EGR valve; and using the mixer output temperature to estimate the intake manifold temperature at the location of the third temperature sensor.

16. An exhaust gas recirculation (EGR) flow correction system for an engine air system comprising an air input, an EGR input and a mixer; the EGR flow correction system comprising:

a first temperature sensor to measure the temperature of air passing through the air input;

a second temperature sensor to measure the temperature of EGR gases passing through the EGR input;

a third temperature sensor to measure the temperature of mixed gases after passing through the mixer, the mixed gas being a mixture of the air passing through the air input and the EGR gases passing through the EGR input;

an engine air system model to model the engine air system using an EGR flow correction;

wherein the engine air system model uses the first, second and third temperature sensor measurements to update the EGR flow correction.

17. The EGR flow correction system of claim 16, wherein the engine air system further comprises an intake manifold, the air input comprises a charge air cooler (CAC) and an air throttle, and the EGR input comprises an EGR cooler and an EGR valve; the first temperature sensor being located between the CAC and the air throttle, the second temperature sensor being located between the EGR cooler and the EGR valve and the third temperature sensor being located in the intake manifold.

18. The EGR flow correction system of claim 17, wherein the engine air system model comprises:

an air throttle mass flow model to estimate a mass flow through the air throttle;

a CAC thermal model to estimate a CAC outlet temperature based on the first temperature sensor measurement and the mass flow through the air throttle;

an EGR valve mass flow model to estimate a mass flow through the EGR valve;

an EGR cooler thermal model to estimate an EGR cooler outlet temperature based on the second temperature sensor measurement and the mass flow through the EGR valve;

a mixer input model to estimate a mixer input temperature based on the estimated CAC outlet temperature, the estimated EGR cooler outlet temperature and the mass flows through the air throttle and the EGR valve;

a mixer thermal model to estimate a mixer output temperature based on the estimated mixer input temperature and the mass flows through the air throttle and the EGR valve;

an intake manifold thermal model to estimate an intake manifold temperature at the location of the third temperature sensor based on the mixer output temperature and the mass flows through the air throttle and the EGR valve; and an EGR flow correction model to compute the EGR flow correction based on the difference between the third temperature sensor reading and the estimated intake manifold temperature at the location of the third temperature sensor.

19. The EGR flow correction system of claim 18; wherein the intake manifold thermal model comprises:

an intake manifold conduction model to model heat conduction of the intake manifold; and an intake manifold convection model to model heat convection of the intake manifold.

20. The EGR flow correction system of claim 19, wherein the CAC thermal model further comprises a CAC effectiveness model; and the EGR cooler thermal model further comprises an EGR cooler effectiveness model.

* * * * *